(12) United States Patent
Deshpande et al.

(10) Patent No.: US 10,521,367 B2
(45) Date of Patent: Dec. 31, 2019

(54) SYSTEMS AND METHODS FOR CONTENT INFORMATION COMMUNICATION

(71) Applicant: Sharp Kabushiki Kaisha, Sakai, Osaka (JP)

(72) Inventors: Sachin G. Deshpande, Camas, WA (US); Peter T. Moser, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 201 days.

(21) Appl. No.: 15/563,633

(22) PCT Filed: Apr. 22, 2016

(86) PCT No.: PCT/JP2016/002162
§ 371 (c)(1),
(2) Date: Oct. 2, 2017

(87) PCT Pub. No.: WO2016/170798
PCT Pub. Date: Oct. 27, 2016

(65) Prior Publication Data
US 2018/0067876 A1    Mar. 8, 2018

Related U.S. Application Data

(60) Provisional application No. 62/281,583, filed on Jan. 21, 2016, provisional application No. 62/151,295, filed on Apr. 22, 2015.

(51) Int. Cl.
*G06F 13/14* (2006.01)
*H04N 21/435* (2011.01)
(Continued)

(52) U.S. Cl.
CPC .......... *G06F 13/14* (2013.01); *H04N 21/435* (2013.01); *H04N 21/436* (2013.01); *H04L 67/02* (2013.01); *H04N 21/4341* (2013.01)

(58) Field of Classification Search
CPC .......................... G06F 13/14; H04N 21/4126
See application file for complete search history.

(56) References Cited

U.S. PATENT DOCUMENTS

| | | | | |
|---|---|---|---|---|
| 6,539,408 B1 * | 3/2003 | Gley | ....................... | G06F 7/544 708/207 |
| 8,589,495 B1 * | 11/2013 | Beckert | ................... | G06F 9/542 709/204 |

(Continued)

FOREIGN PATENT DOCUMENTS

| | | |
|---|---|---|
| JP | 2014-140135 A | 7/2014 |
| WO | 2014/113603 A2 | 7/2014 |

OTHER PUBLICATIONS

Official Communication issued in International Patent Application No. PCT/JP2016/002162, dated Jul. 26, 2016.
(Continued)

*Primary Examiner* — Arvin Eskandarnia
(74) *Attorney, Agent, or Firm* — Keating & Bennett, LLP

(57) ABSTRACT

Message exchange techniques for content information communication between a primary device and a companion device are described. Content information may include service guide data. Message exchange techniques may include subscription techniques and request-response techniques. Example message exchange formats may include defined elements. Elements may be defined according an element name, a type, cardinality, a description, and a data type. In one example, an Extensible Markup Language (XML) based schema is defined for content identification information message. In one example, a JavaScript Object Notation (JSON) schema is defined for content identification information message.

17 Claims, 50 Drawing Sheets

(51) Int. Cl.
*H04N 21/436* (2011.01)
*H04L 29/08* (2006.01)
*H04N 21/434* (2011.01)

(56) References Cited

U.S. PATENT DOCUMENTS

| | | | |
|---|---|---|---|
| 2007/0061860 A1* | 3/2007 | Walker | H04L 63/10 |
| | | | 725/117 |
| 2007/0220558 A1 | 9/2007 | Jung et al. | |
| 2010/0083336 A1 | 4/2010 | Hwang et al. | |
| 2010/0214069 A1* | 8/2010 | Kong | G05B 23/0229 |
| | | | 340/10.1 |
| 2013/0088640 A1 | 4/2013 | Tobita | |
| 2014/0036728 A1* | 2/2014 | An | H04W 40/02 |
| | | | 370/254 |
| 2014/0201334 A1 | 7/2014 | Wang et al. | |
| 2018/0067876 A1* | 3/2018 | Deshpande | H04N 21/435 |

OTHER PUBLICATIONS

ISO/IEC, "Information technology—Dynamic adaptive streaming over HTTP (DASH)—Part 1: Media presentation description and segment formats", ISO/IEC 23009-1: 2014(E), May 15, 2014, 89 pages.

Open Mobile Alliance, "Service Guide for Mobile Broadcast Services Approved Version 1.0.1", OMA-TS-BCAST_Service_Guide-V1_0_1-20130109-A, Jan. 9, 2013. pp. 1-232.

Advanced Television Systems Committee, "ATSC Candidate Standard: Interactive Services Standard (A/105:2014)", Rev. 7, S13-2-389r7, Apr. 24, 2014, 139 pages.

\* cited by examiner

FIG. 5

Content Information Subscription Request Message Schema

```
{
    "id": "http://atsc.org/version/3.0/cd/ci_sub_req_cd2pd#",
    "$schema": "http://json-schema.org/draft-04/schema#",
    "title": "ATSC Content information subscription Request from CD to PD",
    "description": "Content information subscription Request from CD to PD Schema as defined in ATSC 3.0 (c) 2014 atsc.org - All rights reserved.",
    "type": "object",
    "properties": {
    "required": ["ContentInfoSubscriptionRequestfromCDtoPD"],
    "ContentInfoSubscriptionRequestfromCDtoPD"  {
      "type": "object",
      "properties": {
        "ContentInfoSubscriptionCallbackURL": {
           "type": "string",
           "format": "uri"
        },
        "ContentInfoSubscriptionDuration": {
           "type": "number"
        },
        "CDInfo": {
           "type": "object",
           "properties": {
             "CDDevID": {
                "type": "string"
             },
             "CDAppID": {
                "type": "string"
             },
             "CDAppVersion":{
                "type": "number"
             }
           }
        }
      },
      "required": ["ContentInfoSubscriptionCallbackURL","ContentInfoSubscriptionDuration"],
      "additionalProperties": false },
      "maxProperties": 1
  }
 }
```

FIG. 6

Content Information Subscription Request Message Payload

```
{
    "ContentInfoSubscriptionRequestfromCDtoPD": {
        "ContentInfoSubscriptionCallbackURL": "http://192.168.0.100/CD/
CI01",
        "ContentInfoSubscriptionDuration": 6400,
        "CDInfo": {
                    "CDDevID": "CDDevId01",
                        "CDAppID": "ID01",
                            "CDAppVersion": 0.9
        }
    }
}
```

FIG. 7

Content Information Subscription Request Message Schema

```
<xs:schema xmlns:xs="http://www.w3.org/2001/XMLSchema" >
  <xs:element name="ContentInfoSubscriptionRequestfromCDtoPD"
type="ContentInfoSubscriptionRequestType" />
  <xs:complexType name="ContentInfoSubscriptionRequestType">
    <xs:all>
      <xs:element name="ContentInfoSubscriptionCallbackURL" type="xs:anyURI"
minOccurs="1"/>
      <xs:element name="ContentInfoSubscriptionDuration" type="xs:float"
minOccurs="1"/>
      <xs:element name="CDInfo" type="CDInfoType" minOccurs="0"
maxOccurs="1"/>
    </xs:all>
  </xs:complexType>
  <xs:complexType name="CDInfoType">
    <xs:all>
      <xs:element name="CDDevID" type="xs:string" minOccurs="0"
maxOccurs="1"/>
      <xs:element name="CDAppID" type="xs:string" minOccurs="0"
maxOccurs="1"/>
      <xs:element name="CDAppVersion" type="xs:float" minOccurs="0"
maxOccurs="1"/>
    </xs:all>
  </xs:complexType>
</xs:schema>
```

FIG. 8A

Content Information Subscription Request Message http://192.168.0.200/PD/CINFO/cisubReq_CD2PD?
ContentInfoSubscriptionCallbackURL=http%3A%2F%2F192.168.0.100%2FCD%2FCB01&Content
InfoSubscriptionDuration=6400

FIG. 8B

Content Information Subscription Request Message

GET /PD/CINFO/cisubReq_CD2PD?
ContentInfoSubscriptionCallbackURL=http%3A%2F%2F192.168.0.100%2FCD%2FCB01&Content
InfoSubscriptionDuration=6400
  host: http://192.168.0.200

FIG. 8C

Content Information Subscription Request Message

POST /PD/CINFO/cisubReq_CD2PD HTTP/1.1
host: http://192.168.0.200
content-type:application/x-www-form-urlencoded;charset=utf-8
content-length: <content length of request>

ContentInfoSubscriptionCallbackURL=http%3A%2F%2F192.168.0.100%2
FCD%2FCB01&
  ContentInfoSubscriptionDuration=6400

FIG. 9

Content Information Subscription Request Response Message Schema

```
{
    "id": "http://atsc.org/version/3.0/cd/ci_sub_resp_pd2cd#",
    "$schema": "http://json-schema.org/draft-04/schema#",
    "title": "ATSC Content information subscription Request Response from PD to CD",
    "description": "Content information subscription Request Response from PD to CD Schema as defined in ATSC 3.0 (c) 2014 atsc.org - All rights reserved.",
    "type": "object",
    "properties": {
    "required": ["ContentInfoSubscriptionRequestResponsefromPDtoCD"],
    "ContentInfoSubscriptionRequestResponsefromPDtoCD": {
      "type": "object",
      "properties": {
        "ContentInfoSubscriptionID": {
          "type": "string"
        },
        "ContentInfoSubscriptionTimeoutDuration": {
          "type": "number"
        },
        "PDInfo": {
          "type": "object",
          "properties": {
            "PDDevID": {
              "type": "string"
            },
            "PDVersion":{
              "type": "number"
            }
          }
        }
      }
    },
    "required":
["ContentInfoSubscriptionID","ContentInfoSubscriptionTimeoutDuration"],
    "additionalProperties": false },
    "maxProperties": 1
  }
}
```

FIG. 10

Content Information Subscription Request Response Message Payload

```
{
    "ContentInfoSubscriptionRequestResponsefromPDtoCD": {
        "ContentInfoSubscriptionID": "CINFO9887",
        "ContentInfoSubscriptionTimeoutDuration": 6400,
    "PDInfo": {
        "PDDevID": "PDDevId01",
            "PDVersion": 1.0
    }
  }
}
```

FIG. 11

Content Information Subscription Request Response Message Schema

```
<xs:schema xmlns:xs="http://www.w3.org/2001/XMLSchema" >
  <xs:element name="ContentInfoSubscriptionRequestResponsefromPDtoCD"
type="ContentInfoSubscriptionResponseType" />
  <xs:complexType name="ContentInfoSubscriptionResponseType">
    <xs:all>
      <xs:element name="ContentInfoSubscriptionID" type="xs:anyURI"
minOccurs="1"/>
      <xs:element name="ContentInfoSubscriptionTimeoutDuration"
type="xs:float" minOccurs="1"/>
      <xs:element name="PDInfo" type="PDInfoType" minOccurs="0"
maxOccurs="1"/>
    </xs:all>
  </xs:complexType>
  <xs:complexType name="PDInfoType">
    <xs:all>
      <xs:element name="PDDevID" type="xs:string" minOccurs="0"
maxOccurs="1"/>
      <xs:element name="PDAppID" type="xs:string" minOccurs="0"
maxOccurs="1"/>
      <xs:element name="PDVersion" type="xs:float" minOccurs="0"
maxOccurs="1"/>
    </xs:all>
  </xs:complexType>
</xs:schema>
```

FIG. 12A

Content Information Subscription Request Response Message

HTTP/1.1 200 OK
content-type:text/xml
content-length: <content length of response>

<ContentInfoSubscriptionRequestResponsefromPDtoCD>

<ContentInfoSubscriptionID>CINFO9887</ContentInfoSubscriptionID>

<ContentInfoSubscriptionTimeoutDuration>6400</ContentInfoSubscriptionTimeoutDuration>

<PDInfo>

<PDDevID>PDDevId01</PDDevID>

<PDVersion>1.0</PDVersion>

</PDInfo>
</ContentInfoSubscriptionRequestResponsefromPDtoCD>

FIG. 12B

Content Information Subscription Request Response Message

HTTP/1.1 200 OK
content-type:application/json
content-length: <content length of response>

```
{
        "ContentInfoSubscriptionID": "CINFO9887",
        "ContentInfoSubscriptionTimeoutDuration": 6400,
    "PDInfo": {
           "PDDevID": "PDDevId01",
                        "PDVersion": 1.0
        }
}
```

FIG. 14

```
                   Content Information Notification Message Schema
{
        "id": "http://atsc.org/version/3.0/cd/contentinfo_pd2cd#",
        "$schema": "http://json-schema.org/draft-04/schema#",
        "title": "ATSC Content Notification Information Message from PD to CD",
        "description": "Content Notification Information Message from PD to CD Schema
                        as defined in ATSC 3.0 (c) 2014 atsc.org - All rights reserved.",
        "type": "object",
        "properties": {
        "required": ["ContentNotificationMessagefromPDtoCD"],
   "ContentNotificationMessagefromPDtoCD": {
            "type": "object",
            "properties": {
                "ContentInfoSubscriptionID" {           "type": "string"        },
                "notificationID" {          "type": "string"        },
                "serviceID":    {           "type": "string"        },
                "programID":    {           "type": "string"        },
                "showID":       {           "type": "string"        },
                "Name":         {           "type": "string"        },
                "Description":  {           "type": "string"        },
                "CARatings":    {           "type": "string"        },
                "Components": {
                  "type": "object",
                  "properties": {
                  "CARatings": {            "type": "string"            },
                     "componentType":       {           "type": "number"        },
                     "componentRole":       {           "type": "string"        },
                     "componentName":       {           "type": "string"        },
                     "componentID":         {           "type": "string"        },
                     "componentURL":        {           "type": "string"        }
                                },
                  "required":
  ["componentType","componentRole","componentName","componentID","componentURL"]
            },
                "NRTContentItem": {
                   "type": "object",
                   "properties": {
                   "NRTItemLocation":           {           "type": "string"        },
                      "NRTItemID":             {           "type": "string"        },
                      "NRTItemName":           {           "type": "string"        },
                      "NRTContentType":        {           "type": "string"        },
                      "NRTContentEncoding":    {           "type": "string"        }
                },
                   "required": ["NRTItemLocation","NRTItemID","NRTItemName",
                               "NRTContentType","NRTContentEncoding"]
             }
                        },
        "required": ["serviceID","programID","showID","segmentID","Name",
                        "Description","CARatings"],
        "additionalProperties": false        },
        "maxProperties": 1
                }
}
```

FIG. 15

Content Information Notification Message Payload

```
{
 "ContentNotificationMessagefromPDtoCD": {
  "ContentInfoSubscriptionID": "CINFO9887",
   "notificationID": 587,
    "serviceID": "CNBC",
"programID": "123",
"showID": "1234567",
"Name": "Power Lunch",
"Description": "Reports on Stock Market trends.",
"CARatings": "NR",
"Components": {
 "CARatings": "NR",
 "componentType": 1,
 "componentRole": "Primary Video",
 "componentName": "Current Stock Market Trends",
 "componentID": "1234567",
 "componentURL": "http://powerlunch.com/components/1234567"
},
"NRTContentItem": {
     "NRTItemLocation": "http://powerlunch.com/nrt/fileABCD.gz"
 "NRTItemID": "NR1234567",
 "NRTItemName": "2014 Stock Market Overview",
 "NRTContentType": "video",
 "NRTContentEncoding": "gzip"
}
 }
  }
```

FIG. 16

Content Information Notification Message Schema

```xml
<?xml version="1.0" encoding="UTF-8"?>
<xs:schema xmlns:xs="http://www.w3.org/2001/XMLSchema">
     <xs:import namespace="http://www.w3.org/XML/1998/namespace"
               schemaLocation="http://www.w3.org/2001/xml.xsd"/>
     <xs:element name="ContentInfo" type="ContentInfoType"/>
<xs:complexType name="ContentInfoType">
          <xs:sequence>
               <xs:element name="ContentInfoSubscriptionID" type="xs:string" minOccurs="0" maxOccurs="1"/>
               <xs:element name="NotificationID" type="xs:string" minOccurs="0" maxOccurs="1"/>
               <xs:element name="serviceID" type="xs:string" minOccurs="0" maxOccurs="unbounded"/>
               <xs:element name="programID" type="xs:string" minOccurs="1" />
               <xs:element name="showID" type="xs:string" minOccurs="1" />
               <xs:element name="segmentID" type="xs:string" minOccurs="1" maxOccurs="unbounded"></xs:element>
               <xs:element name="Name" type="xs:string" minOccurs="0" maxOccurs="unbounded"/>
               <xs:element name="Description" type="xs:string" minOccurs="0" maxOccurs="unbounded"/>
               <xs:element name="CARatings" type="xs:string" minOccurs="1" />
               <xs:element name="Component" minOccurs="0" maxOccurs="unbounded">
                    <xs:complexType>
                         <xs:sequence>
                              <xs:element name="CARatings" type="xs:string" minOccurs="0" maxOccurs="1"/>
                         </xs:sequence>
                         <xs:attribute name="componentType" type="xs:unsignedByte" use="required"/>
                         <xs:attribute name="componentRole" type="xs:string" use="required"/>
                         <xs:attribute name="componentName" type="xs:string" use="optional"/>
                         <xs:attribute name="componentID" type="xs:string" use="required"/>
                         <xs:attribute name="componentURL" type="xs:anyURI" use="required"/>
                    </xs:complexType>
               </xs:element>
               <xs:element name="NRTContentItem" minOccurs="0" maxOccurs="unbounded">
                    <xs:complexType>
     <xs:attribute name="NRTItemLocation" type="xs:anyURI" use="required"/>
     <xs:attribute name="NRTItemID" type="xs:string" use="required"/>
     <xs:attribute name="NRTItemName" type="xs:string" use="optional"/>
     <xs:attribute name="NRTContentType" type="xs:string" use="required"/>
     <xs:attribute name="NRTContentEncoding" type="xs:string" use="required"/>
                    </xs:complexType>
               </xs:element>
        </xs:sequence>
</xs:complexType>
</xs:schema>
```

FIG. 18

```
{                    Content Information Notification Message Schema
   "id": "http://atsc.org/version/3.0/cd/contentinfo_pd2cd#",
   "$schema": "http://json-schema.org/draft-04/schema#",
   "title": "ATSC Content Information Notification Message from PD to CD",
   "description": "Content Information Notification Message from PD to CD Schema
                      as defined in ATSC 3.0 (c) 2014 atsc.org - All rights reserved.",
   "type": "object",  "maxProperties": 1,  "required": ["service"],  "properties": {
     "service": {    "type": "object",    "required": ["id","show"],
       "properties": {
                       "ContentSubscriptionID":      {       "type": "string"      },
                       "NotificationID {    "type": "string"      },
                       "id":           {      "type": "string"      },
                       "name":         {      "type": "string"      },
                       "description": {      "type": "string"      },
                       "programID":    {      "type": "string"      },
       "show": {     "type": "object",     "required": ["id"],
         "properties": {
                       "id":           {       "type": "string"      },
                       "name":         {       "type": "string"      },
                       "description": {       "type": "string"      },
                       "segments": { "title": "segment", "type": "array", "minitems": "0",
           "items": {        "type": "object",  "required": ["id", "cTime", "sType"],
             "properties": {
             "id": {         "type": "string"          },
             "cTime": {          "type": "integer"         },
             "sType": {     "type": {
                "enum": [ "show",           "interstitial"         ]
             }        }        }       } },
           "components": { "title": "component",    "type": "array",     "minitems": "0",
             "items": {"type": "object", required": ["id","name","url","type","CARatings"],
               "properties": {
               "id":             {           "type": "string"           },
               "CARatings":      {           "type": "string"           },
               "name":           {           "type": "string"           },
               "role":           {           "type": "string"           },
               "url":            {           "type": "string"           },
               "type":                {"type": {"enum": ["audio", "video", "closedCaption",
                                          "application",   "metaData",]   }
               }    }    }       },
           "NRTContentItems": { "title": "NRTContentItem", "type": "array", "minitems": "0",
             "items": {"type": "object", "required": ["id","name","url","contentType"],
               "properties": {
               "id":             {           "type": "string"           },
               "name":           {           "type": "string"           },
               "url":            {           "type": "string"           },
               "contentType":    {           "type": "string"           }
              }    }    }    }     }     }   }}
```

FIG. 19A

Content Information Notification Message Schema

```xml
<?xml version="1.0" encoding="UTF-8"?>
<schema xmlns = "http://www.w3.org/2001/XMLSchema"
   targetNamespace = "urn:atsc30:schema:esg:notification:1.0"
   xmlns:xs = "http://www.w3.org/2001/XMLSchema"
   version = "1.0">
   <element name="service">
     <complexType>
       <sequence>
         <element name="ContentInfosubcriptionID" type="xs:string" minOccurs="0" maxOccurs="1"/>
         <element name="NotificationID" type="xs:string" minOccurs="0" maxOccurs="1"/>
         <element name="id" type="xs:string"/>
         <element name="name" type="xs:string"/>
         <element name="description" type="xs:string"/>
         <element name="programID" type="xs:string"/>
         <element name="show">
           <complexType>
             <sequence minOccurs="1" maxOccurs="unbounded">
               <element name="id" type="xs:string"/>
               <element name="name" type="xs:string"/>
               <element name="description" type="xs:string"/>
               <element name="CARatings" type="xs:string"/>
               <element name="segment">
                 <complexType>
                   <sequence>
                     <element name="id" type="xs:string"/>
                     <element name="cTime" type="xs:long"/>
                     <element name="sType">
                       <simpleType>
                         <restriction base="xs:string">
                           <enumeration value="show" />
                           <enumeration value="interstitial" />
                         </restriction>
                       </simpleType>
                     </element>
                   </sequence>
                 </complexType>
               </element>
             </sequence>
           </complexType>
         </element>
```

Content Information Notification Message Schema

FROM 19A
```
<element name="component" >
  <complexType>
    <sequence minOccurs="1" maxOccurs="unbounded">
      <element name="id" type="xs:string"/>
      <element name="name" type="xs:long"/>
      <element name="role" type="xs:long"/>
      <element name="url" type="xs:anyURI"/>
      <element name="type">
        <simpleType>
          <restriction base="xs:string">
            <enumeration value="audio" />
            <enumeration value="video" />
            <enumeration value="closedCaption" />
            <enumeration value="application" />
            <enumeration value="metaData" />
          </restriction>
        </simpleType>
      </element>
    </sequence>
  </complexType>
</element>
<element name="NRTContentItem" >
  <complexType>
    <sequence minOccurs="1" maxOccurs="unbounded">
      <element name="id" type="xs:string"/>
      <element name="name" type="xs:long"/>
      <element name="url" type="xs:anyURI"/>
      <element name="contentType"/>
    </sequence>
  </complexType>
</element>
    </sequence>
  </complexType>
</element>
</schema>
```

FIG. 20A

Content Information Notification Message http://192.168.0.100/PD/CINFO/
cistate_PD2CD?CINFO9887&serviceID=CNBC&Name=Power%20Lunch&programID=123&notificationID=587

FIG. 20B

Content Information Notification Message

GET /PD/ CINFO/
cistate_PD2CD?ContentInfoSubscriptionID=CINFO9887&serviceID=CNBC&Name=Power%20Lunch&programID=123&notificationID=587 HTTP/1.1
host: http://192.168.0.100

FIG. 20C

Content Information Notification Message

POST /PD/CINFO/cistate_PD2CD HTTP/1.1
host: http://192.168.0.100
content-type:application/x-www-form-urlencoded;charset=utf-8
content-length: <content length of request>
{
  "ContentInfoSubscriptionID": "CINFO9887",
    "notificationID": 587,
      "serviceID": "CNBC",
"programID": "123",
"showID": "1234567",
"Name": "Power Lunch",
"Description": "Reports on Stock Market trends.",
"CARatings": "NR",
"Components": {
 "CARatings": "NR",
 "componentType": 1,
 "componentRole": "Primary Video",
 "componentName": "Current Stock Market Trends",
 "componentID": "1234567",
 "componentURL": "http://powerlunch.com/components/1234567"
},
"NRTContentItem": {
      "NRTItemLocation": "http://powerlunch.com/nrt/fileABCD.gz"
 "NRTItemID": "NR1234567",
 "NRTItemName": "2014 Stock Market Overview",
 "NRTContentType": "video",
 "NRTContentEncoding": "gzip"
}}

FIG. 20D

Service and Content Identification Message

```
{
"id": "http://atsc.org/version/3.0/cd/ServiceInfo_pd2cd#",
"$schema": "http://json-schema.org/draft-04/schema#",
"title": "Service and Content Identification Message Body",
"description": "Service and Content Identification Message Body from PD to CD uses this Schema",
"type": "object",
"properties": {
   "MessageBody": {
      "type": "object",
      "properties": {
         "Service": {
            "type": "array",
            "items": {
               "type": "object",
               "properties": {
                  "id": { "type": "string", "format": "uri" },
                  "ServiceType": { "type": "integer", "minimum": 0, "maximum": 255 },
                  "Name": {
                     "type": "array",
                     "items": {
                        "type": "object",
                        "properties": {
                           "text": {"type": "string"},
                           "lang": {"type": "string"}
                        },
                        "required": [ "text" ]
                     },
                     "minItems": 1
                  },
                  "Description": {
                  "type": "array",
                  "items": {
                     "type": "object",
                     "properties": {
                        "text": {"type": "string"},
                        "lang": {"type": "string"}
                     },
                     "required": [ "text" ]
                  },
                  "minItems": 0
               },
```

```
                                        FROM 20D
            "TargetUserProfile": {
              "type": "array",
              "items": {
                "type": "object",
                "properties": {
                   "attributeName": {"type": "string"},
                   "attributeValue": {"type": "string"}
                },
                "required": [ "attributeName", "attributeValue" ]
              },
              "minItems": 0
            }
         },
         "required": [ "id", "ServiceType", "Name" ]
      },
      "minItems": 1
   },
   "Content": {
      "type": "array",
      "items": {
        "type": "object",
        "properties": {
          "Programid": { "type": "string", "format": "uri" },
          "Name": {
             "type": "array",
             "items": {
                "type": "object",
                "properties": {
                   "text": {"type": "string"},
                   "lang": {"type": "string"}
                },
                "required": [ "text" ]
             },
             "minItems": 1
          },
          "Description": {
              "type": "array",
              "items": {
                "type": "object",
                "properties": {
                   "text": {"type": "string"},
                   "lang": {"type": "string"}
                },
                "required": [ "text" ]
              },"minItems": 0
          },
                                         TO 20F
```

FIG. 20F

```
                                      FROM 20E
"TargetUserProfile": {
  "type": "array",
  "items": {
    "type": "object",
    "properties": {
      "attributeName": {"type": "string"},
      "attributeValue": {"type": "string"}
    },
    "required": [ "attributeName", "attributeValue" ]
  },
  "minItems": 0
},
"CARatings": {"type": "string"},
"Capabilities": {"type": "string"},
"Components": {
  "type": "array",
  "items": {
    "type": "object",
    "properties": {
      "componentID": {"type": "string"},
      "componentType": {
        "type": "integer",
        "minimum": 0,
        "maximum": 255
      },
      "componentRole": {"type": "string"},
      "componentName": {"type": "string"},
      "componentLocation": {
        "type": "string",
        "format": "uri"
      }
    },
    "required": [ "componentID", "componentType", "componentRole" ]
  },
  "minItems": 1
},
                                       TO 20G
```

FIG. 20G

```
                                          FROM 20F
                    "FileContentItem": {
                      "type": "array",
                      "items": {
                        "type": "object",
                        "properties": {
                          "FileContentItemLocation": { "type": "string", "format": "uri" },
                          "FileContentItemName": {"type": "string"},
                          "FileContentItemID": {"type": "string"},
                          "FileContentItemType": {"type": "string"},
                          "FileContentItemEncoding": {"type": "string"}
                        },
                        "required": [
                          "FileContentItemLocation",
                          "FileContentItemID",
                          "FileContentItemType",
                          "FileContentItemEncoding"
                        ]
                      },
                      "minItems": 0
                    },
                    "TimelineInfo": {
                      "type": "object",
                      "properties": {"currentTime": {
                        "type": "string",
                        "format": "date-time"
                      }},
                      "required": ["currentTime"]
                    },
                    "Location": {
                      "type": "string",
                      "format": "uri"
                    }
                  },
                  "required": [ "Programid", "Name", "CARatings", "Capabilities",
"Components" ]
                },
                "minItems": 0
              }
            },
            "required": ["Service"]
          },
          "required": ["MessageBody"],
          "additionalProperties": false
        }
}"minItems": 1
                  },
```

FIG. 21

Content Information Notification Response Message Schema

```
{
    "id": "http://atsc.org/version/3.0/cd/mpstate_resp_cd2pd#",
    "$schema": "http://json-schema.org/draft-04/schema#",
    "title": "ATSC Media Playback State Notification Response from CD to PD",
    "description": "Media Playback State Notification Response from CD to PD Schema as defined in ATSC 3.0 (c) 2014 atsc.org - All rights reserved.",
    "type": "object",
    "properties": {
    "required": ["ContentInformationMessageNotificationResponsefromCDtoPD"],
    "ContentInformationMessageNotificationResponsefromCDtoPD": {
        "type": "object",
        "properties": {
            "ContentInfoSubscriptionID": {
                "type": "string"
            },
            "notificationID": {
                "type": "string"
            },
            "CDInfo": {
                "type": "object",
                "properties": {
                    "CDDevID": {
                        "type": "string"
                    },
                    "CDAppID": {
                        "type": "string"
                    },
                    "CDAppVersion":{
                        "type": "number"
                    }
                }
            }
        },
        "required": ["ContentInfoSubscriptionID","notificationID"],
        "additionalProperties": false },
        "maxProperties": 1
    }
}
```

FIG. 22

Content Information Notification Response Message Payload

```
{
    "ContentInformationMessageNotificationResponsefromCDtoPD": {
        "ContentInfoSubscriptionID": "CINFO9887",
        "notificationID": "587",
        "CDInfo": {
            "CDDevID": "CDDevId01",
                "CDAppID": "ID01",
                                        "CDAppVersion": 0.9
        }
    }
}
```

FIG. 23

Content Information Notification Response Message Schema

```
<xs:schema xmlns:xs="http://www.w3.org/2001/XMLSchema" >
  <xs:element name="ContentInformationMessageResponsefromCDtoPD"
type="ContentInformationMessageResponseMessageType" />
    <xs:complexType name="ContentInformationMessageResponseMessageType">
      <xs:all>
        <xs:element name="ContentInfoSubscriptionID" type="xs:string" minOccurs="1"/>
        <xs:element name="notificationID" type="xs:string" minOccurs="1"/>
        <xs:element name="CDInfo" type="CDInfoType" minOccurs="0" maxOccurs="1"/>
      </xs:all>
    </xs:complexType>
  <xs:complexType name="CDInfoType">
    <xs:all>
      <xs:element name="CDDevID" type="xs:string" minOccurs="0" maxOccurs="1"/>
      <xs:element name="CDAppID" type="xs:string" minOccurs="0" maxOccurs="1"/>
      <xs:element name="CDAppVersion" type="xs:float" minOccurs="0" maxOccurs="1"/>
    </xs:all>
  </xs:complexType>
</xs:schema>
```

FIG. 24A

Content Information Notification Response Message

HTTP/1.1 200 OK

FIG. 24B

Content Information Notification Response Message

HTTP/1.1 200 OK
content-type:text/xml
content-length: <content length of response>

<ContentInformationMessageResponsefromCDtoPD>

<ContentInfoSubscriptionID>CINFO9887</ContentInfoSubscriptionID>

<notificationID>587</notificationID>

<CDInfo>

<CDDevID>CDDevId01</CDDevID>

<CDAppID>ID01</CDAppID>

<CDAppVersion>0.9</CDAppVersion>

</CDInfo>

</ContentInformationMessageResponsefromCDtoPD>

FIG. 24C

Content Information Notification Response Message

HTTP/1.1 200 OK
content-type:application/json
content-length: <content length of response>

```
{
        "ContentInfoSubscriptionID": "CINFO9887",
        "notificationID": "587",
  "CDInfo": {
          "CDDevID": "CDDevId01",
                "CDAppID": "ID01",
                       "CDAppVersion": 0.9
        }
}
```

FIG. 25

Content Information Subscription Renew Request Message Schema

```
{
    "id": "http://atsc.org/version/3.0/cd/ci_sub_renew_req_cd2pd#",
    "$schema": "http://json-schema.org/draft-04/schema#",
    "title": "ATSC Content information subscription Renew Request from CD to PD",
    "description": "Content information subscription Renew Request from CD to PD Schema as defined in ATSC 3.0 (c) 2014 atsc.org - All rights reserved.",
    "type": "object",
    "properties": {
    "required": ["ContentInfoSubscriptionRenewRequestfromCDtoPD"],
    "ContentInfoSubscriptionRenewRequestfromCDtoPD": {
      "type": "object",
      "properties": {
        "ContentInfoSubscriptionID": {
          "type": "string"
        },
        "ContentInfoSubscriptionDuration": {
          "type": "number"
        },
        "CDInfo": {
          "type": "object",
          "properties": {
            "CDDevID": {
              "type": "string"
            },
            "CDAppID": {
              "type": "string"
            },
            "CDAppVersion":{
              "type": "number"
            }
          }
        }
      },
      "required": ["ContentInfoSubscriptionID","ContentInfoSubscriptionDuration"],
      "additionalProperties": false },
      "maxProperties": 1
    }
}
```

FIG. 26

```
Content Information Subscription Renew Request
             Message Payload
    {
       "ContentInfoSubscriptionRenewRequestfromCDtoPD": {
              "ContentInfoSubscriptionID": "CINFO9887",
              "ContentInfoSubscriptionDuration": 7200,
          "CDInfo": {
              "CDDevID": "CDDevId01",
                     "CDAppID": "ID01",
                             "CDAppVersion": 0.9
          }
       }
    }
```

FIG. 27

Content Information Subscription Renew Request Message Schema

```
{
    "id": "http://atsc.org/version/3.0/cd/ci_sub_renew_req_cd2pd#",
    "$schema": "http://json-schema.org/draft-04/schema#",
    "title": "ATSC Content information subscription Renew Request from CD to PD",
    "description": "Content information subscription Renew Request from CD to PD Schema as defined in ATSC 3.0 (c) 2014 atsc.org - All rights reserved.",
    "type": "object",
    "properties": {
    "required": ["ContentInfoSubscriptionRenewRequestfromCDtoPDVariant"],
    "ContentInfoSubscriptionRenewRequestfromCDtoPDVariant": {
      "type": "object",
      "properties": {
        "ContentInfoSubscriptionID": {
           "type": "string"
        },
         "ContentInfoSubscriptionCallbackURL": {
           "type": "string",
           "format": "uri"
        },
        "ContentInfoSubscriptionDuration": {
           "type": "number"
        },
        "CDInfo": {
           "type": "object",
           "properties": {
             "CDDevID": {
                "type": "string"
             },
             "CDAppID": {
                "type": "string"
             },
             "CDAppVersion":{
                "type": "number"
             }
           }
        }
      },
      "required": ["ContentInfoSubscriptionID","ContentInfoSubscriptionDuration"],
      "additionalProperties": false },
      "maxProperties": 1
   }
}
```

FIG. 28

Content Information Subscription Renew Request Message Payload

```
"ContentInfoSubscriptionRenewRequestfromCDtoPDVariant": {
        "ContentInfoSubscriptionID": "CINFO9887",
        "ContentInfoSubscriptionCallbackURL": "http://192.168.0.100/CD/CI01",
        "ContentInfoSubscriptionDuration": 7200,
    "CDInfo": {
        "CDDevID": "CDDevId01",
            "CDAppID": "ID01",
                        "CDAppVersion": 0.9
        }
   }
}
```

FIG. 29

Content Information Subscription Renew Request Message Schema

```
<xs:schema       xmlns:xs="http://www.w3.org/2001/XMLSchema"       >
    <xs:element    name="ContentInfoSubscriptionRenewRequestfromCDtoPD"
type="ContentInfoSubscriptionRenewRequestType"                   />
    <xs:complexType    name="ContentInfoSubscriptionRenewRequestType">
        <xs:all>
            <xs:element   name="ContentInfoSubscriptionID"   type="xs:string"
minOccurs="1"/>
            <xs:element name="ContentInfoSubscriptionDuration" type="xs:float"
minOccurs="1"/>
            <xs:element   name="CDInfo"   type="CDInfoType"   minOccurs="0"
maxOccurs="1"/>
        </xs:all>
    </xs:complexType>
    <xs:complexType                                        name="CDInfoType">
        <xs:all>
            <xs:element   name="CDDevID"   type="xs:string"   minOccurs="0"
maxOccurs="1"/>
            <xs:element   name="CDAppID"   type="xs:string"   minOccurs="0"
maxOccurs="1"/>
            <xs:element name="CDAppVersion" type="xs:float" minOccurs="0"
maxOccurs="1"/>
        </xs:all>
    </xs:complexType>
</xs:schema>
```

FIG. 30

Content Information Subscription Renew Request Message Schema

```
<xs:schema              xmlns:xs="http://www.w3.org/2001/XMLSchema"            >
  <xs:element                     name="ContentInfoSubscriptionRenewRequestfromCDtoPD"
type="ContentInfoSubscriptionRenewRequestType"                                />
  <xs:complexType            name="ContentInfoSubscriptionRenewRequestType">
    <xs:all>
      <xs:element name="ContentInfoSubscriptionID" type="xs:string" minOccurs="1"/>
      <xs:element    name="ContentInfoSubscriptionCallbackURL"    type="xs:anyURI"
minOccurs="1"/>
      <xs:element       name="ContentInfoSubscriptionDuration"       type="xs:float"
minOccurs="1"/>
      <xs:element name="CDInfo" type="CDInfoType" minOccurs="0" maxOccurs="1"/>
    </xs:all>
  </xs:complexType>
  <xs:complexType                                              name="CDInfoType">
    <xs:all>
      <xs:element name="CDDevID" type="xs:string" minOccurs="0" maxOccurs="1"/>
      <xs:element name="CDAppID" type="xs:string" minOccurs="0" maxOccurs="1"/>
      <xs:element name="CDAppVersion" type="xs:float" minOccurs="0" maxOccurs="1"/
>
    </xs:all>
  </xs:complexType>
</xs:schema>
```

FIG. 31A

Content Information Subscription Renew Request Message http://192.168.0.200/PD/CINFO/
cisub_renew_req_CD2PD?ContentInfoSubscriptionID=CINFO9887&ContentInfoSubscriptionDuration=7200

FIG. 31B

Content Information Subscription Renew Request Message

GET /PD/CINFO/
cisub_renew_req_CD2PD?ContentInfoSubscriptionID=CINFO9887&ContentInfoSubscriptionDuration=7200
       HTTP/1.1
host: http://192.168.0.200

FIG. 31C

Content Information Subscription Renew Request Message

POST /PD/CINFO/cisub_renew_req_CD2PD HTTP/1.1
host: http://192.168.0.200
content-type:application/x-www-form-urlencoded;charset=utf-8
content-length: <content length of request>

ContentInfoSubscriptionID=CINFO9887&ContentInfoSubscriptionDuration=7200

FIG. 32

Content Information Subscription Renew Request Response Message Schema

```
{
    "id": "http://atsc.org/version/3.0/cd/ci_sub_renew_resp_pd2cd#",
    "$schema": "http://json-schema.org/draft-04/schema#",
    "title": "ATSC Content information subscription Renew Response from PD to CD",
    "description": "Content information subscription Renew Response from PD to CD Schema as defined in ATSC 3.0 (c) 2014 atsc.org - All rights reserved.",
    "type": "object",
    "properties": {
    "required": ["ContentInfoSubscriptionRenewResponsefromPDtoCD"],
    "ContentInfoSubscriptionRenewResponsefromPDtoCD": {
      "type": "object",
      "properties": {
        "ContentInfoSubscriptionID": {
          "type": "string"
        },
        "ContentInfoSubscriptionTimeoutDuration": {
          "type": "number"
        },
        "PDInfo": {
          "type": "object",
          "properties": {
            "PDDevID": {
              "type": "string"
            },
            "PDVersion":{
              "type": "number"
            }
          }
        }
      },
      "required": ["ContentInfoSubscriptionID","ContentInfoSubscriptionTimeoutDuration"],
      "additionalProperties": false },
      "maxProperties": 1
  }
}
```

FIG. 33

Content Information Subscription Renew Request Response Message Payload

```
{
    "ContentInfoSubscriptionRenewResponsefromPDtoCD": {
        "ContentInfoSubscriptionID": "CINFO9887",
        "ContentInfoSubscriptionTimeoutDuration": 7200,
        "PDInfo": {
            "PDDevID": "PDDevId01",
            "PDVersion": 1.0
        }
    }
}
```

FIG. 34

Content Information Subscription Renew Request Response Message Schema

```
<xs:schema    xmlns:xs="http://www.w3.org/2001/XMLSchema"    >
    <xs:element    name="ContentInfoSubscriptionRenewResponsefromCDtoPD"
type="ContentInfoSubscriptionRenewResponseType"    />
    <xs:complexType    name="ContentInfoSubscriptionRenewResponseType">
        <xs:all>
        <xs:element name="ContentInfoSubscriptionID" type="xs:anyURI" minOccurs="1"/>
        <xs:element    name="ContentInfoSubscriptionTimeoutDuration"    type="xs:float"
minOccurs="1"/>
        <xs:element name="PDInfo" type="PDInfoType" minOccurs="0" maxOccurs="1"/>
        </xs:all>
    </xs:complexType>
    <xs:complexType                                          name="PDInfoType">
        <xs:all>
            <xs:element name="PDDevID" type="xs:string" minOccurs="0" maxOccurs="1"/>
            <xs:element name="PDVersion" type="xs:float" minOccurs="0" maxOccurs="1"/>
        </xs:all>
    </xs:complexType>
</xs:schema>
```

FIG. 35A

Content Information Subscription Renew Request Response Message

HTTP/1.1 200 OK
content-type:text/xml
content-length: <content length of response>

<ContentInfoSubscriptionRenewResponsefromCDtoPD>

<ContentInfoSubscriptionID>CINFO9887</ContentInfoSubscriptionID>

<ContentInfoSubscriptionTimeoutDuration>60</ContentInfoSubscriptionTimeoutDuration>

<PDInfo>

<PDDevID>PDDevId01</PDDevID>

<PDVersion>1.0</PDVersion>

</PDInfo>

</ContentInfoSubscriptionRenewResponsefromCDtoPD>

FIG. 35B

Content Information Subscription Renew Request Response Message

HTTP/1.1 200 OK
content-type:application/json
content-length: <content length of response>

```
{
        "ContentInfoSubscriptionID": "CINFO9887",

"ContentInfoSubscriptionTimeoutDuration": 7200,
            "PDInfo": {
                  "PDDevID": "PDDevId01",
                           "PDVersion": 1.0
            }
}
```

FIG. 36

**Content Information Subscription Cancel Request
Message Schema**

```
{
    "id": "http://atsc.org/version/3.0/cd/ci_sub_cancel_req_cd2pd#",
    "$schema": "http://json-schema.org/draft-04/schema#",
    "title": "ATSC Media Playback Subscription Cancel Request from CD to PD",
    "description": "Media Playback Subscription Cancel Request from CD to PD Schema as defined in ATSC 3.0 (c) 2014 atsc.org - All rights reserved.",
    "type": "object",
    "properties": {
    "required": ["ContentInfoSubscriptionCancelRequestfromCDtoPD"],
    "ContentInfoSubscriptionCancelRequestfromCDtoPD": {
      "type": "object",
      "properties": {
        "ContentInfoSubscriptionID": {
          "type": "string"
        }
      }
    },
    "required": ["ContentInfoSubscriptionID"],
    "additionalProperties": false },
    "maxProperties": 1
  }
}
```

FIG. 37

**Content Information Subscription Cancel Request
Message Payload**

```
{
    "ContentInfoSubscriptionCancelRequestfromCDtoPD": {
            "ContentInfoSubscriptionID": "CINFO9887"
    }
}
```

FIG. 38

**Content Information Subscription Cancel Request
Message Schema**

```
{
    "id": "http://atsc.org/version/3.0/cd/ci_sub_cancel_req_cd2pd#",
    "$schema": "http://json-schema.org/draft-04/schema#",
    "title": "ATSC Media Playback Subscription Cancel Request from CD to PD",
    "description": "Media Playback Subscription Cancel Request from CD to PD Schema as defined in ATSC 3.0 (c) 2014 atsc.org - All rights reserved.",
    "type": "object",
    "properties": {
    "required": ["ContentInfoSubscriptionCancelRequestfromCDtoPD"],
    "ContentInfoSubscriptionCancelRequestfromCDtoPD": {
        "type": "object",
        "properties": {
          "ContentInfoSubscriptionID": {
            "type": "string"
          },
          "CDInfo": {
            "type": "object",
            "properties": {
              "CDDevID": {
                "type": "string"
              },
              "CDAppID": {
                "type": "string"
              },
              "CDAppVersion":{
                "type": "number"
              }
            }
          }
        },
        "required": ["ContentInfoSubscriptionID"],
        "additionalProperties": false },
        "maxProperties": 1
    }
}
```

FIG. 39

| Content Information Subscription Cancel Request Message Payload |
|---|
| {<br>   "ContentInfoSubscriptionCancelRequestfromCDtoPD": {<br>       "ContentInfoSubscriptionID": "CINFO9887",<br>    "CDInfo": {<br>       "CDDevID": "CDDevId01",<br>          "CDAppID": "ID01",<br>                   "CDAppVersion": 0.9<br>    }<br>   }<br>} |

FIG. 40

```
Content Information Subscription Cancel Request
                Message Schema
{
    "id": "http://atsc.org/version/3.0/cd/ci_sub_cancel_req_cd2pd#",
    "$schema": "http://json-schema.org/draft-04/schema#",
    "title": "ATSC Content information subscription Cancel Request from CD to PD",
    "description": "Content information subscription Cancel Request from CD to PD Schema
as defined in ATSC 3.0 (c) 2014 atsc.org - All rights reserved.",
    "type": "object",
    "properties": {
    "required": ["ContentInfoSubscriptionCancelRequestfromCDtoPD"],
    "ContentInfoSubscriptionCancelRequestfromCDtoPD": {
      "type": "object",
      "properties": {
        "ContentInfoSubscriptionID": {
          "type": "string"
        },
        "ContentInfoSubscriptionDuration" {
          "type": "number"
        },
        "CDInfo": {
          "type": "object",
          "properties": {
            "CDDevID": {
              "type": "string"
            },
            "CDAppID": {
              "type": "string"
            },
            "CDAppVersion":{
              "type": "number"
            }
          }
        }
      },
      "required": ["ContentInfoSubscriptionID","ContentInfoSubscriptionDuration"],
      "additionalProperties": false },
      "maxProperties": 1
   }
}
```

FIG. 41

Content Information Subscription Cancel Request Message Payload

```
{
    "ContentInfoSubscriptionCancelRequestfromCDtoPDVariant": {
            "ContentInfoSubscriptionID": "CINFO9887",
            "ContentInfoSubscriptionDuration": 0,
        "CDInfo": {
            "CDDevID": "CDDevId01",
                "CDAppID": "ID01",
                                        "CDAppVersion": 0.9
        }
    }
}
```

FIG. 42

Content Information Subscription Cancel Request Message Schema

```
<xs:schema          xmlns:xs="http://www.w3.org/2001/XMLSchema"          >
   <xs:element            name="ContentInfoSubscriptionCancelRequestfromCDtoPD"
type="ContentInfoSubscriptionCancelRequestType"                            />
   <xs:complexType       name="ContentInfoSubscriptionCancelRequestType">
      <xs:all>
         <xs:element    name="ContentInfoSubscriptionID"     type="xs:string"
minOccurs="1"/>
</xs:all>
   </xs:complexType>
</xs:schema>
```

FIG. 43

Content Information Subscription Cancel Request Message Schema

```
<xs:schema xmlns:xs="http://www.w3.org/2001/XMLSchema" >
  <xs:element name="ContentInfoSubscriptionCancelRequestfromCDtoPD"
type="ContentInfoSubscriptionCancelRequestType" />
  <xs:complexType name="ContentInfoSubscriptionCancelRequestType">
    <xs:all>
      <xs:element name="ContentInfoSubscriptionID" type="xs:string" minOccurs="1"/>
      <xs:element name="CDInfo" type="CDInfoType" minOccurs="0" maxOccurs="1"/>
    </xs:all>
  </xs:complexType>
  <xs:complexType name="CDInfoType">
    <xs:all>
      <xs:element name="CDDevID" type="xs:string" minOccurs="0" maxOccurs="1"/>
      <xs:element name="CDAppID" type="xs:string" minOccurs="0" maxOccurs="1"/>
      <xs:element name="CDAppVersion" type="xs:float" minOccurs="0" maxOccurs="1"/>
    </xs:all>
  </xs:complexType>
</xs:schema>
```

FIG. 44

Content Information Subscription Cancel Request Message Schema

```
<xs:schema          xmlns:xs="http://www.w3.org/2001/XMLSchema"           >
  <xs:element                name="ContentInfoSubscriptionCancelRequestfromCDtoPD"
type="ContentInfoSubscriptionCancelRequestType"                           />
  <xs:complexType            name="ContentInfoSubscriptionCancelRequestType">
    <xs:all>
      <xs:element name="ContentInfoSubscriptionID" type="xs:string" minOccurs="1"/>
<xs:element name="ContentInfoSubscriptionDuration" type="xs:float" minOccurs="1"/>
      <xs:element name="CDInfo" type="CDInfoType" minOccurs="0" maxOccurs="1"/>
    </xs:all>
  </xs:complexType>
  <xs:complexType name="CDInfoType">
    <xs:all>
      <xs:element name="CDDevID" type="xs:string" minOccurs="0" maxOccurs="1"/>
      <xs:element name="CDAppID" type="xs:string" minOccurs="0" maxOccurs="1"/>
      <xs:element name="CDAppVersion" type="xs:float" minOccurs="0" maxOccurs="1"/>
    </xs:all>
  </xs:complexType>
</xs:schema>
```

FIG. 45A

Content Information Subscription Cancel Request Message http://192.168.0.200/PD/CINFO/cisub_cancel_req_CD2PD?ContentInfoSubscriptionID=CINFO9887

FIG. 45B

Content Information Subscription Cancel Request Message

GET /PD/CINFO/cisub_cancel_req_CD2PD?ContentInfoSubscriptionID= CINFO9887 HTTP/1.1
host: http://192.168.0.200

FIG. 45C

Content Information Subscription Cancel Request Message

POST /PD/CINFO/cisub_cancel_req_CD2PD HTTP/1.1
host: http://192.168.0.200
content-type:application/x-www-form-urlencoded;charset=utf-8
content-length: <content length of request>

ContentInfoSubscriptionID=CINFO9887

FIG. 46

**Content Information Subscription Cancel Request
Response Message Schema**

```
{
    "id": "http://atsc.org/version/3.0/cd/ci_sub_cancel_resp_pd2cd#",
    "$schema": "http://json-schema.org/draft-04/schema#",
    "title": "ATSC Content information subscription Cancel Response from PD to CD",
    "description": "Content information subscription Cancel Response from PD to CD
Schema as defined in ATSC 3.0 (c) 2014 atsc.org - All rights reserved.",
    "type": "object",
    "properties": {
    "required": ["ContentInfoSubscriptionCancelResponsefromPDtoCD"],
    "ContentInfoSubscriptionCancelResponsefromPDtoCD": {
      "type": "object",
      "properties": {
        "CICancelStatusCode": {
          "type": "number"
        },
        "CICancelStatusString": {
          "type": "string"
        },
        "PDInfo": {
          "type": "object",
          "properties": {
            "PDDevID": {
              "type": "string"
            },
            "PDVersion":{
              "type": "number"
            }
          }
        }
      },
      "required": ["CICancelStatusCode","CICancelStatusString"],
      "additionalProperties": false },
      "maxProperties": 1
  }
}
```

FIG. 47

Content Information Subscription Cancel Request Response Message Payload

```
{
    "ContentInfoSubscriptionCancelResponsefromPDtoCD": {
        "CICancelStatusCode": 200,
        "CICancelStatusString": "OK",
        "PDInfo": {
            "PDDevID": "PDDevId01",
            "PDVersion": 1.0
        }
    }
}
```

FIG. 48

Content Information Subscription Cancel Request Response Message Schema

```
{
    "id": "http://atsc.org/version/3.0/cd/ci_sub_cancel_resp_pd2cd#",
    "$schema": "http://json-schema.org/draft-04/schema#",
    "title": "ATSC Content information subscription Cancel Response from PD to CD",
    "description": "Content information subscription Cancel Response from PD to CD Schema as defined in ATSC 3.0 (c) 2014 atsc.org - All rights reserved.",
    "type": "object",
    "properties": {
    "required": ["ContentInfoSubscriptionCancelResponsefromPDtoCD"],
    "ContentInfoSubscriptionCancelResponsefromPDtoCD": {
      "type": "object",
      "properties": {
        "CICancelStatusCode": {
          "type": "number"
        },
        "CICancelStatusString": {
          "type": "string"
        }
      }
    },
    "required": ["CICancelStatusCode","CICancelStatusString"],
    "additionalProperties": false },
    "maxProperties": 1
  }
}
```

FIG. 49

**Content Information Subscription Cancel Request
Response Message Payload**

```
{
    "ContentInfoSubscriptionCancelResponsefromPDtoCD
    ": {
            "ClCancelStatusCode": 200,
            "ClCancelStatusString": "OK"
    }
}
```

FIG. 50

**Content Information Subscription Cancel Request
Response Message Schema**

```
<xs:schema xmlns:xs="http://www.w3.org/2001/XMLSchema" >
  <xs:element name="ContentInfoSubscriptionCancelResponsefromCDtoPD"
type="ContentInfoSubscriptionCancelResponseType" />
  <xs:complexType name="ContentInfoSubscriptionCancelResponseType">
    <xs:all>
      <xs:element name="ClCancelStatusCode" type="xs:int" minOccurs="1"/>
      <xs:element name="ClCancelStatusString" type="xs:string" minOccurs="1"/>
      <xs:element name="PDInfo" type="PDInfoType" minOccurs="0" maxOccurs="1"/>
    </xs:all>
  </xs:complexType>
  <xs:complexType name="PDInfoType">
    <xs:all>
      <xs:element name="PDDevID" type="xs:string" minOccurs="0" maxOccurs="1"/>
      <xs:element name="PDVersion" type="xs:float" minOccurs="0" maxOccurs="1"/>
    </xs:all>
  </xs:complexType>
</xs:schema>
```

FIG. 51

**Content Information Subscription Cancel Request
Response Message Schema**

```
<xs:schema xmlns:xs="http://www.w3.org/2001/XMLSchema" >
  <xs:element name="ContentInfoSubscriptionCancelResponsefromCDtoPD"
type="ContentInfoSubscriptionCancelResponseType" />
  <xs:complexType name="ContentInfoSubscriptionCancelResponseType">
    <xs:all>
      <xs:element name="CICancelStatusCode" type="xs:int" minOccurs="1"/>
      <xs:element name="CICancelStatusString" type="xs:string" minOccurs="1"/>
    </xs:all>
  </xs:complexType>
</xs:schema>
```

FIG. 52A

**Content Information Subscription Cancel Request
Response Message**

HTTP/1.1 200 OK

FIG. 52B

**Content Information Subscription Cancel Request
Response Message**

HTTP/1.1 200 OK
content-type:text/xml
content-length: <content length of response>

<ContentInfoSubscriptionCancelResponsefromCDtoPD>

<CICancelStatusCode>-1</CICancelStatusCode>

<CICancelStatusString>Invalid subscription ID</CICancelStatusString>

</ContentInfoSubscriptionCancelResponsefromCDtoPD>

Content Information Subscription Cancel Request Response Message

HTTP/1.1 200 OK
content-type:application/json
content-length: <content length of response>

{

"PDInfo": {
        "PDDevID": "PDDevId01",
                "PDVersion": 1.0
    }
}

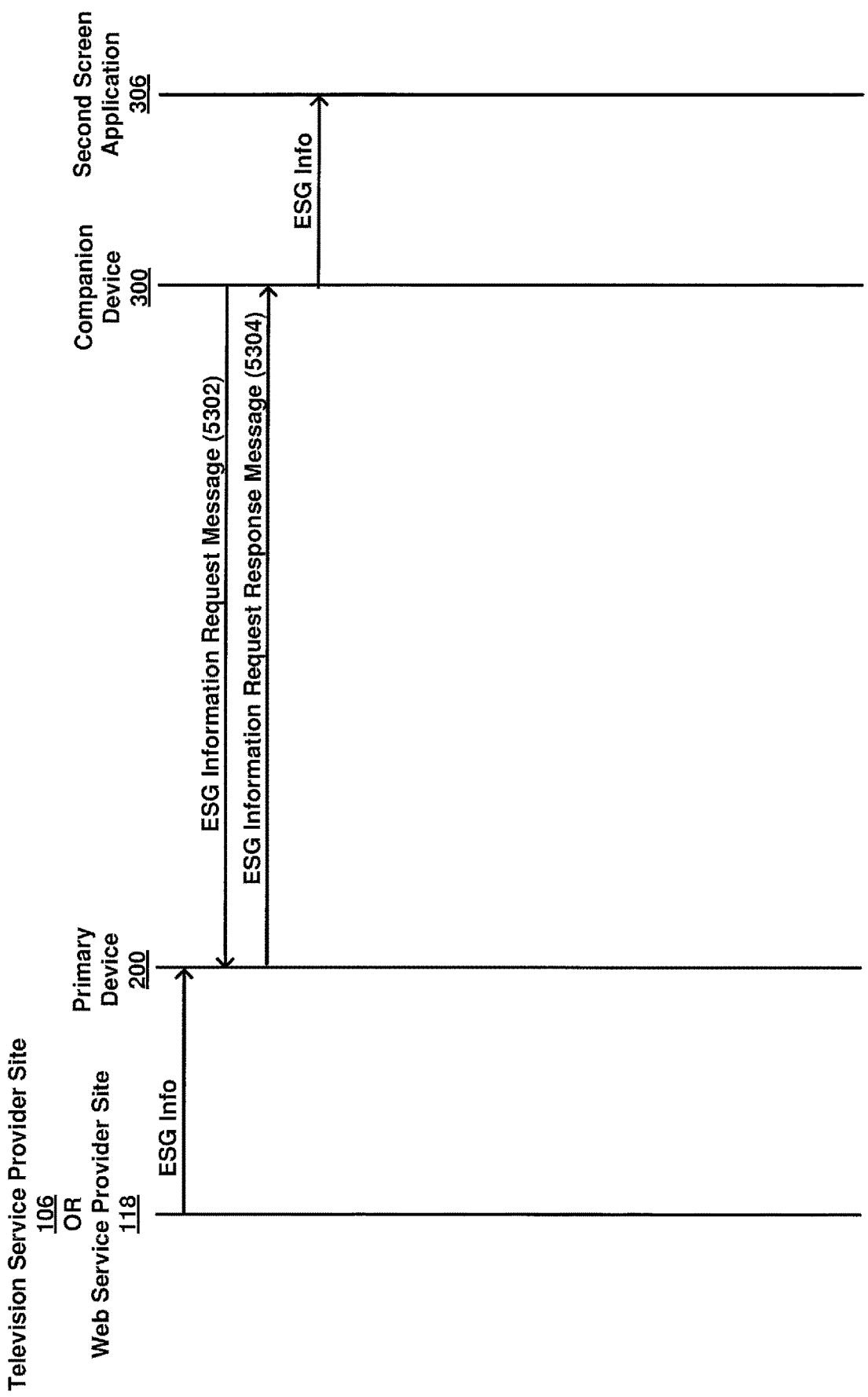

FIG. 54

ESG Information Request Response Message Schema

```
{
  "id": "http://atsc.org/version/3.0/cd/ESGcontentinfo_pd2cd#",
  "$schema": "http://json-schema.org/draft-04/schema#",
  "title": "ATSC ESG message from PD to CD",
  "description": "ESG message from PD to CD Schema as defined in ATSC 3.0 (c) 2014 atsc.org - All rights reserved.",
  "type": "object",
  "properties": {
   "required": [
    "ESGfromPDtoCD"
   ],
   "ESGfromPDtoCD": {
    "type": "object",
    "properties": {
     "PDservice": {
      "type": "object",
      "properties": {
       "service": {
        "type": "object"
       }
      },
      "PDcontent": {
       "type": "object",
       "properties": {
        "content": {
         "type": "object"
        }
       },
       "PDschedule": {
        "type": "object",
        "properties": {
         "schedule": {
          "type": "object"
         }
        }
       }
      }
     },
     "required": [
      "PDservice",
      "PDcontent"
     ],
     "additionalProperties": false
    },
    "maxProperties": 1
   }
  }
 }
}
```

FIG. 55

ESG Information Request Response Message Schema

```xml
<?xml version="1.0" encoding="UTF-8"?>
<xs:schema xmlns:xs="http://www.w3.org/2001/XMLSchema">
    <xs:import namespace="http://www.w3.org/XML/1998/namespace"
               schemaLocation="http://www.w3.org/2001/xml.xsd"/>
    <xs:element name="ContentESGInfo" type="ContentESGInfoType"/>
    <xs:complexType name="ContentESGInfoType">
        <xs:sequence>
            <xs:element name="PDservice">
                <xs:complexType>
                    <xs:sequence>
                        <xs:element name="Service" type="ServiceType"/>
                    </xs:sequence>
                </xs:complexType>
            </xs:element>
            <xs:element name="PDcontent">
                <xs:complexType>
                    <xs:sequence>
                        <xs:element name="Content" type="ContentType"/>
                    </xs:sequence>
                </xs:complexType>
            </xs:element>
            <xs:element name="PDschedule">
                <xs:complexType>
                    <xs:sequence>
                        <xs:element name="Schedule" type="ScheduleType"/>
                    </xs:sequence>
                </xs:complexType>
            </xs:element>
        </xs:sequence>
    </xs:complexType>
</xs:schema>
```

SYSTEMS AND METHODS FOR CONTENT INFORMATION COMMUNICATION

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio) may originate from a plurality of sources including, for example, over-the-air television providers, satellite television providers, cable television providers, online media services, including, so-called streaming services, and the like. Digital media content may be transmitted from a source (e.g., an over-the-air television provider) to a receiver device (e.g., a digital television) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 standard.

In addition to defining how digital media content may be transmitted from a source to a receiver device, transmission standards may define how data may be transmitted to support so-called second screen applications. Second screen applications may refer to applications operating on a device other than a primary receiver device. For example, it may be desirable for a tablet computer to run an application in conjunction with the media playback on the primary media rendering device, where the application enables an enhanced viewing experience. Current techniques for enabling second screen applications may be less than ideal.

SUMMARY OF INVENTION

In general, this disclosure describes techniques for enabling second screen applications. In particular, this disclosure describes techniques for providing content information to a companion device. A companion device may refer to any device other than a primary device, where a primary device is configured to receive and process a transport stream. It should be noted that the term transport stream as used herein may refer specifically to an Internet Protocol (IP) based transport stream. In one example, a transport stream may refer to an ISO Base Media File format (ISO BMFF) based transport stream. In other examples a transport stream may refer to a Moving Pictures Expert Group (MPEG) transport stream, or the like, or may refer generally to any stream or container format including video, audio, and/or content data. Further, it should be noted that a companion device may include all or less than all of the capabilities of a primary device. For example, a companion device may or may not be configured to receive a transport stream. In another example, a companion device may have more or different capabilities compared to a primary device. It should be noted that primary device and companion device may be defined as logical roles. As such, a single physical device may act as both a primary device and/or a companion device at the same time or at different times.

This disclosure describes techniques for enabling communications between a primary device and a companion device. In one example, a companion device may establish a subscription with a primary device and receive content information from the primary device during a subscription duration. In one example, a companion device may extend the duration of a subscription and/or cancel a subscription. In one example, a companion device may request specific items of content information from a primary device, for example, particular elements in a defined service guide. In response to a request, a primary device may provide the specific items of content information to the companion device. It should be noted that although in some examples the techniques of this disclosure are described with respect to ATSC standards, the techniques described herein are generally applicable to any transmission standard. For example, the techniques described herein are generally applicable to any of DVB standards, ISDB standards, Digital Terrestrial Multimedia Broadcast (DTMB) standards, Digital Multimedia Broadcast (DMB) standards, Hybrid Broadcast and Broadband (HbbTV) standards, World Wide Web Consortium (W3C) standards, and Universal Plug and Play (UPnP) standards. Further, the techniques described herein may be applicable to enabling second screen applications regardless of how digital multimedia is provided to a primary device. The techniques described herein may be particularly useful for enabling an enhanced viewing experience by enabling second screen applications that utilize content information. For example, the techniques described herein may be particularly useful for enabling an interactive electronic programming guide (EPG) to be presented to a user on a companion device.

According to one example of the disclosure, a method of transmitting content information comprises receiving a content information subscription request message, transmitting a content information subscription request response message, and transmitting one or more content information notification messages during a subscription.

According to another example of the disclosure, a device for transmitting content information comprises one or more processors configured to receive a content information subscription request message, transmit a content information subscription request response message, and transmit one or more content information notification messages during a subscription.

According to another example of the disclosure, an apparatus for transmitting content information comprises means for receiving a content information subscription request message, means for transmitting a content information subscription request response message, and means for transmitting one or more content information notification messages during a subscription.

According to another example of the disclosure, a non-transitory computer-readable storage medium comprises instructions stored thereon that upon execution cause one or more processors of a device to receive a content information subscription request message, transmit a content information subscription request response message, and transmit one or more content information notification messages during a subscription.

According to one example of the disclosure, a method for receiving content information comprises transmitting a content information subscription request message, receiving a content information subscription request response message, and receiving one or more content information notification messages during a subscription.

According to another example of the disclosure, a device for receiving content information comprises one or more processors configured to transmit a content information subscription request message, receive a content information subscription request response message, and receive one or more content information notification messages during a subscription.

According to another example of the disclosure, an apparatus for receiving content information comprises means for transmitting a content information subscription request message, means for receiving a content information subscription request response message, and means for receiving one or more content information notification messages during a subscription.

According to another example of the disclosure, a non-transitory computer-readable storage medium comprises instructions stored thereon that upon execution cause one or more processors of a device to transmit a content information subscription request message, receive a content information subscription request response message, and receive one or more content information notification messages during a subscription.

According to one example of the disclosure, a method of transmitting service guide information comprises receiving a service guide request message, and transmitting a service guide request response message.

According to another example of the disclosure, a device for transmitting service guide information comprises one or more processors configured to receive a service guide request message, and transmit a service guide request response message.

According to another example of the disclosure, an apparatus for transmitting service guide information comprises means for receiving a service guide request message, and means for transmitting a service guide request response message.

According to another example of the disclosure, a non-transitory computer-readable storage medium comprises instructions stored thereon that upon execution cause one or more processors of a device to receive a service guide request message, and transmit a service guide request response message.

According to one example of the disclosure, a method for receiving service guide information comprises transmitting a service guide request message, and receiving a service guide request response message.

According to another example of the disclosure, a device for receiving service guide information comprises one or more processors configured to transmit a service guide request message, and receive a service guide request response message.

According to another example of the disclosure, an apparatus for receiving service guide information comprises means for transmitting a service guide request message, and means for receiving a service guide request response message.

According to another example of the disclosure, a non-transitory computer-readable storage medium has instructions stored thereon that upon execution cause one or more processors of a device to transmit a service guide request message, and receive a service guide request response message.

In addition to receiving the service guide message some or all of the information from it may be displayed to the user, also the received service guide information may be stored.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a computer program listing illustrating an example schema of an example content information subscription request message.

FIG. 6 is a computer program listing illustrating an example content information subscription request message payload according to the example schema illustrated in FIG. 5.

FIG. 7 is a conceptual diagram illustrating an example schema of an example content information subscription request message.

FIG. 8A is computer program listings illustrating examples of content information subscription request messages.

FIG. 8B is computer program listings illustrating examples of content information subscription request messages.

FIG. 8C is computer program listings illustrating examples of content information subscription request messages.

FIG. 9 is a computer program listing illustrating an example schema of an example content information subscription request response message.

FIG. 10 is a computer program listing illustrating an example content information subscription request response message payload according to the example schema illustrated in FIG. 9.

FIG. 11 is a computer program listing illustrating an example schema of an example content information subscription request response message.

FIG. 12A is computer program listings illustrating examples of content information subscription request response messages.

FIG. 12B is computer program listings illustrating examples of content information subscription request response messages.

FIG. 14 is a computer program listing illustrating an example schema of an example content information notification message.

FIG. 15 is a computer program listing illustrating an example content information notification message payload according to the example schema illustrated in FIG. 14.

FIG. 16 is a computer program listing illustrating an example schema of an example content information notification message.

FIG. 18 is a computer program listing illustrating an example schema of an example content information notification message.

FIG. 19A is a computer program listing illustrating an example schema of an example content information notification message.

FIG. 19B is a computer program listing illustrating an example schema of an example content information notification message.

FIG. 20A is computer program listings illustrating examples of content information notification messages.

FIG. 20B is computer program listings illustrating examples of content information notification messages.

FIG. 20C is computer program listings illustrating examples of content information notification messages.

FIG. 20D is a computer program listing illustrating an example schema of an example service and content identification message.

FIG. 20E is a computer program listing illustrating an example schema of an example service and content identification message.

FIG. 20F is a computer program listing illustrating an example schema of an example service and content identification message.

FIG. 20G is a computer program listing illustrating an example schema of an example service and content identification message.

FIG. 21 is a computer program listing illustrating an example schema of an example content information notification response message.

FIG. 22 is a computer program listing illustrating an example content information notification response message payload according to the example schema illustrated in FIG. 21.

FIG. 23 is a computer program listing illustrating an example schema of an example content information notification response message.

FIG. 24A is computer program listings illustrating examples of content information notification response messages.

FIG. 24B is computer program listings illustrating examples of content information notification response messages.

FIG. 24C is computer program listings illustrating examples of content information notification response messages.

FIG. 25 is a computer program listing illustrating an example schema of an example content information subscription renew request message.

FIG. 26 is a computer program listing illustrating an example content information subscription renew request message payload according to the example schema illustrated in FIG. 25.

FIG. 27 is a computer program listing illustrating an example schema of an example content information subscription renew request message.

FIG. 28 is a computer program listing illustrating an example content information subscription renew request message payload according to the example schema illustrated in FIG. 27.

FIG. 29 is a computer program listing illustrating an example schema of an example content information subscription renew request message.

FIG. 30 is a computer program listing illustrating an example schema of an example content information subscription renew request message.

FIG. 31A is computer program listings illustrating examples of content information subscription renew request messages.

FIG. 31B is computer program listings illustrating examples of content information subscription renew request messages.

FIG. 31C is computer program listings illustrating examples of content information subscription renew request messages.

FIG. 32 is a computer program listing illustrating an example schema of an example content information subscription renew request response message.

FIG. 33 is a computer program listing illustrating an example content information subscription renew request response message payload according to the example schema illustrated in FIG. 32.

FIG. 34 is a computer program listing illustrating an example schema of an example content information subscription renew request response message.

FIG. 35A is computer program listings illustrating examples of content information subscription renew request messages.

FIG. 35B is computer program listings illustrating examples of content information subscription renew request messages.

FIG. 36 is a computer program listing illustrating an example schema of an example content information subscription cancel request message.

FIG. 37 is a computer program listing illustrating an example content information subscription cancel request message payload according to the example schema illustrated in FIG. 36.

FIG. 38 is a computer program listing illustrating an example schema of an example content information subscription cancel request message.

FIG. 39 is a computer program listing illustrating an example content information subscription cancel request message payload according to the example schema illustrated in FIG. 38.

FIG. 40 is a computer program listing illustrating an example schema of an example content information subscription cancel request message.

FIG. 41 is a computer program listing illustrating an example content information subscription cancel request message payload according to the example schema illustrated in FIG. 40.

FIG. 42 is a computer program listing illustrating an example schema of an example content information subscription cancel request message.

FIG. 43 is a computer program listing illustrating an example schema of an example content information subscription cancel request message.

FIG. 44 is a computer program listing illustrating an example schema of an example content information subscription cancel request message.

FIG. 45A is computer program listings illustrating examples of content information subscription cancel request messages.

FIG. 45B is computer program listings illustrating examples of content information subscription cancel request messages.

FIG. 45C is computer program listings illustrating examples of content information subscription cancel request messages.

FIG. 46 is a computer program listing illustrating an example schema of an example content information subscription cancel request response message.

FIG. 47 is a computer program listing illustrating an example content information subscription cancel request response message payload according to the example schema illustrated in FIG. 46.

FIG. 48 is a computer program listing illustrating an example schema of an example content information subscription cancel request response message.

FIG. 49 is a computer program listing illustrating an example content information subscription cancel request response message payload according to the example schema illustrated in FIG. 48.

FIG. 50 is a computer program listing illustrating an example schema of an example content information subscription cancel request response message.

FIG. 51 is a computer program listing illustrating an example schema of an example content information subscription cancel request response message.

FIG. 52A is computer program listings illustrating examples of content information subscription cancel request response messages.

FIG. 52B is computer program listings illustrating examples of content information subscription cancel request response messages.

FIG. 52C is computer program listings illustrating examples of content information subscription cancel request response messages.

FIG. 53 is a conceptual diagram illustrating an example communications flow between a primary device and a companion device.

FIG. 54 is a computer program listing illustrating an example schema of an example service guide request response message.

FIG. 55 is a computer program listing illustrating an example schema of an example service guide request response message.

DESCRIPTION OF EMBODIMENTS

Figure 1:
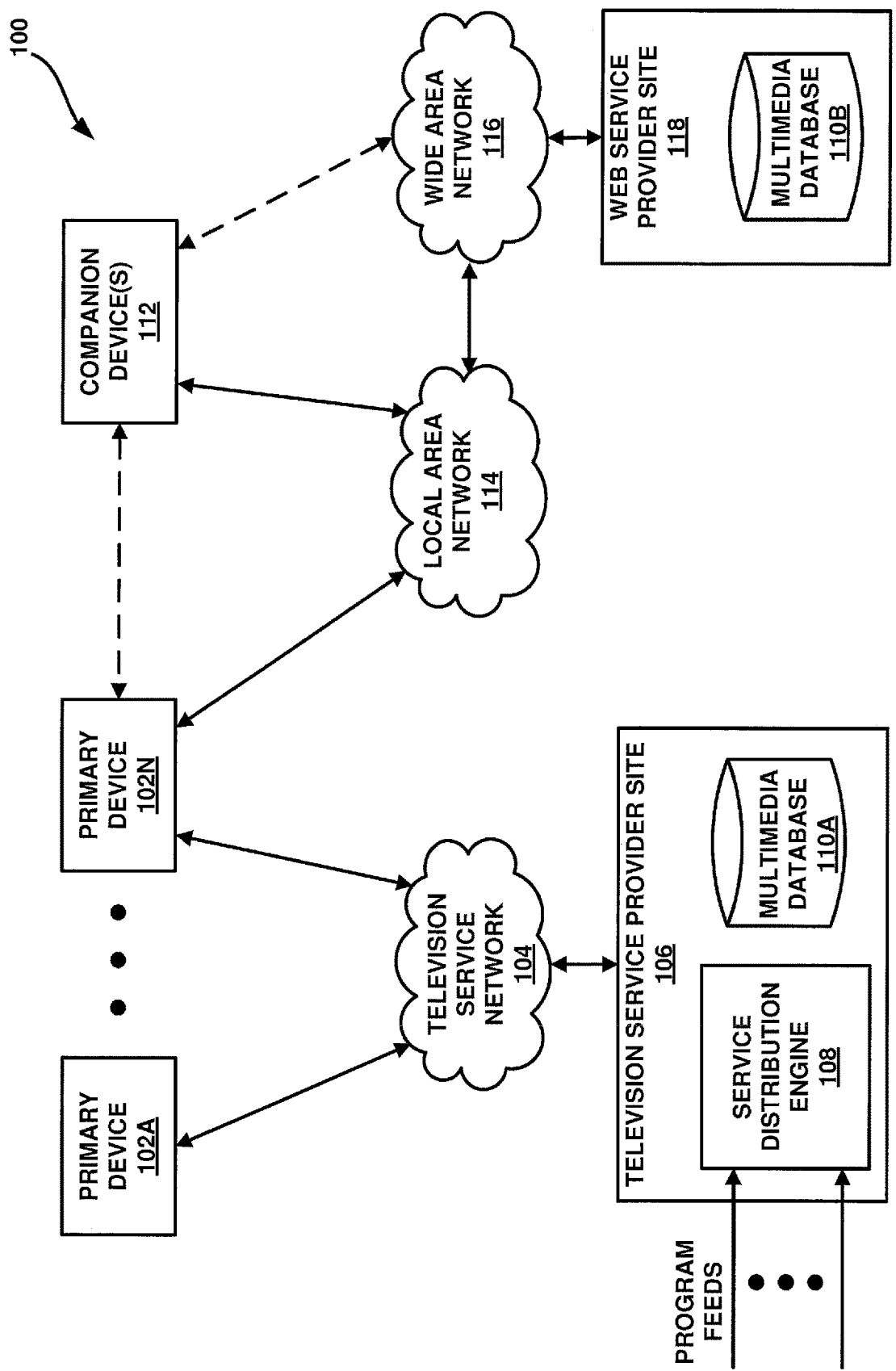
FIG. 1 is a block diagram illustrating an example of a system that may implement one or more techniques of this disclosure.

As described above, transmission standards may define how data may be provided to a companion device to support second screen applications. ATSC Candidate Standard: Interactive Services Standard (A/105:2014), 513-2-389r7, 12 Dec. 2013, Rev. 7, 24 Apr. 2014 (hereinafter "ATSC 2.0 A105"), specifies services that can be provided by a device configured to receive an ATSC 2.0 transport stream to support the display of content related to an Audio and/or Video (A/V) broadcast by applications running on second screen devices. According to ATSC 2.0 A105, an ATSC 2.0 receiver may support the following services for the use by a second screen application: trigger delivery service, two-way communications service, and optionally HTTP proxy server service. In ATSC 2.0 A105, trigger delivery service is limited to an ATSC 2.0 receiver simply passing triggers including limited information to a second screen device. The amount of information that may be included in a trigger is limited. Further, in ATSC 2.0 A105, two-way communications service simply provides a Transmission Control Protocol/Internet Protocol (TCP/IP) connection for a primary device (PD) and a second screen device to communicate. That is, each of the primary device and the second screen device must be configured to transmit and receive data according to a proprietary format. This typically results in devices having different manufacturers being incompatible. In ATSC 2.0 A105, HTTP proxy server service simply provides a mechanism for a primary device to act as a proxy for a second screen device, e.g., when a second screen device has limited Internet connectivity. Thus, each of the services for supporting second screen applications in ATSC 2.0 A105 are limited and do not provide content information to an application running on a companion device in an efficient manner.

This disclosure describes techniques for enabling a companion device (CD) to receive content information. In some cases, a companion device and/or an application running thereon may require updates to content information in a manner that minimizes delay. For example, in order to provide a user with a positive experience, a second screen application may require reception of content information in a near real-time manner. That is, a second screen may require updated content information as new content is being rendered on a primary device. For example, if a second screen application is rendering content in conjunction with primary content being rendered on a primary device and a user causes the primary content being rendered to change (e.g., by tuning to a new channel), in order for the second screen application to render new content in conjunction with new primary content, the second screen application needs to be notified of the change in content and receive updated content information in a timely manner. Further, in some cases, content being rendered on a companion device in conjunction with the content being rendered on the primary screen may require synchronization with each other. This disclosure describes techniques for establishing subscriptions that enable a companion device to receive content information in an efficient manner. As described in detail below, once a subscription is established a companion device may receive content information according to established parameters of a subscription as content information changes on the primary device.

In some cases a companion device and/or an application running thereon may require service guide data. In some cases although a companion device may be configured to download service guide data from a server, a companion device may only require a subset of service guide data. Thus, in these cases, it may inefficient for a companion device download service guide data from a server. This disclosure describes techniques for enabling a companion device to request and receive a subset of service guide data from a primary device. In addition to providing an efficient way for a companion device to receive a subset of service guide data, enabling a companion device to request and receive service guide data from a primary device may also provide redundancy which may be useful in the event of a network or server outage. Further, enabling a companion device to request and receive a subset of service guide data from a primary device may enable a companion device to verify whether the service guide data stored thereon is the most current data by comparing one or more items stored thereon with service guide data received from a primary device. In one example, upon determining that the service guide data stored thereon is not current, a companion device may download service guide data from a server.

FIG. 1 is a block diagram illustrating an example of a system that may implement one or more techniques described in this disclosure. System 100 may be configured to provide content information to a companion device in accordance with the techniques described herein. In the example illustrated in FIG. 1, system 100 includes one or more primary devices 102A-102N, television service network 104, television service provider site 106, companion device(s) 112, local area network 114, wide area network 116, and web service provider site 118. System 100 may include software modules. Software modules may be stored in a memory and executed by a processor. System 100 may include one or more processors and a plurality of internal and/or external memory devices. Examples of memory devices include file servers, FTP servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital media content, such as, for example, television (TV) programming, to be distributed to and accessed by a plurality of computing devices, such as primary devices 102A-102N. In the example illustrated in FIG. 1, primary devices 102A-102N may include any device configured to receive a transport stream from television service provider site 106. For example, primary devices 102A-102N may be equipped for wired and/or wireless communications and may include televisions, including so-called smart televisions, set top boxes, and digital video recorders. Further, primary devices 102A-102N may include desktop, laptop, or tablet computers, gaming consoles, mobile devices, including, for example, "smart" phones, cellular telephones, and personal gaming devices configured to receive a transport stream from television service provider site 106. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Television service network 104 is an example of a network configured to enable television services to be provided. For example, television service network 104 may include public over-the-air television networks, public or subscription-based satellite television service provider networks, and public or subscription-based cable television provider networks and/or over the top or Internet service providers. It should be noted that although in some examples television service network 104 may primarily be used to enable television services to be provided, television service network 104 may also enable other types of data and services to be provided according to any combination of the telecommunication protocols described herein. Television service network 104 may comprise any combination of wireless and/or wired communication media. Television service network 104 may include coaxial cables, fiber optic cables, twisted pair cables, wireless transmitters and receivers, routers, switches, repeaters, base stations, or any other equipment that may be useful to facilitate communications between various devices and sites. Television service network 104 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, Hybrid Broadcast and Broadband (HbbTV) standard, W3C standards, and Universal Plug and Play (UPnP) standards.

Referring again to FIG. 1, television service provider site 106 may be configured to distribute television service via television service network 104. For example, television service provider site 106 may include a public broadcast station, a cable television provider, or a satellite television provider. In some examples, television service provider site 106 may include a broadcast service provider or broadcaster. In the example illustrated in FIG. 1, television service provider site 106 includes service distribution engine 108 and multimedia database 110A. Service distribution engine 108 may be configured to receive a plurality of program feeds and distribute the feeds to primary devices 102A-102N through television service network 104. For example, service distribution engine 108 may include a broadcast station configured to transmit television broadcasts according to one or more of the transmission standards described above (e.g., an ATSC standard). Multimedia database 110A may include storage devices configured to store multimedia content and/or content information, including content information associated with program feeds. In some examples, television service provider site 106 may be configured to access stored multimedia content and distribute multimedia content to one or more of primary devices 102A-102N through television service network 104. For example, multimedia content (e.g., music, movies, and TV shows) stored in multimedia database 110A may be provided to a user via television service network 104 on an on demand basis.

As illustrated in FIG. 1, in addition to being configured to receive a transport stream from television service provider site 106, a primary device 102A-102N may be configured to communicate with companion device(s) 112 either directly or through local area network 114. Companion device(s) 112 may include a computing device configured to execute applications is conjunction with a primary device. It should be noted that in the example illustrated in FIG. 1, although a single companion device is illustrated, each primary device 102A-102N may be associated with a plurality of companion device(s). Companion device(s) 112 may be equipped for wired and/or wireless communications and may include devices, such as, for example, desktop, laptop, or tablet computers, mobile devices, smartphones, cellular telephones, and personal gaming devices. It should be noted that although not illustrated in FIG. 1, in some examples, companion device(s) may be configured to receive data from television service network 104.

In the example illustrated in FIG. 1, companion device(s) 112 may be configured to communicate directly with a primary device (e.g., using a short range communications protocol, e.g., Bluetooth), communicate with a primary device via a local area network (e.g., through a Wi-Fi router), and/or communicate with a wide area network (e.g., a cellular network). As described in detail below, a companion device may be configured to receive data, including content information, for use by an application running thereon.

Each of local area network 114 and wide area network 116 may comprise any combination of wireless and/or wired communication media. Each of local area network 114 and wide area network 116 may include coaxial cables, fiber optic cables, twisted pair cables, Ethernet cables, wireless transmitters and receivers, routers, switches, repeaters, base stations, or any other equipment that may be useful to facilitate communications between various devices and sites. Local area network 114 and wide area network 116 may be distinguished based on levels of access. For example, wide area network 116 may enable access to the World Wide Web. Local area network 114 may enable a user to access a subset of devices, e.g., computing devices located within a user's home. In some instances, local area network 114 may be referred to as a personal network or a home network.

Each of local area network 114 and wide area network 116 may be packet based networks and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards, such as, for example, one or more of the IEEE 802 standards (e.g., Wi-Fi). In one example, a primary device and a companion device may communicate over local area network 114 using a local networking protocol, such as for example, a protocol based on the IEEE 802 standards.

Referring again to FIG. 1, web service provider site 118 may be configured to provide hypertext based content, and the like, to one or more of primary devices 102A-102N and/or companion device(s) 112 through wide area network 116. Web service provider site 118 may include one or more web servers. Hypertext content may be defined according to programming languages, such as, for example, Hypertext Markup Language (HTML), Dynamic HTML, Extensible Markup Language (XML), and data formats such as JavaScript Object Notation (JSON). An example of a webpage content distribution site includes the United States Patent and Trademark Office website. Further, web service provider site 118 may be configured to provide content information, including content information associated with program feeds, to primary devices 102A-102N and/or companion device(s) 112. Hypertext content and content information may be utilized for second screen applications. For example, companion device(s) 112 may display a website in conjunction with television programming being presented on a primary device 102A-102N. It should be noted that hypertext based content and the like may include audio and video content. For example, in the example illustrated in FIG. 1, web service provider site 118 may be configured to access a multimedia database 110B and distribute multimedia content and content information to one or more of primary devices 102A-102N and/or companion device(s) 112 through wide area network 116. In one example, web service provider site 118 may be configured to provide multimedia content using the Internet protocol suite. For example, web service provider site 118 may be configured to provide multimedia content to a primary device according to Real Time Streaming Protocol (RTSP). It should be noted that the techniques described herein may be applicable in the case where a primary device receives multimedia content and content information associated therewith from a web service provider site.

Figure 2:
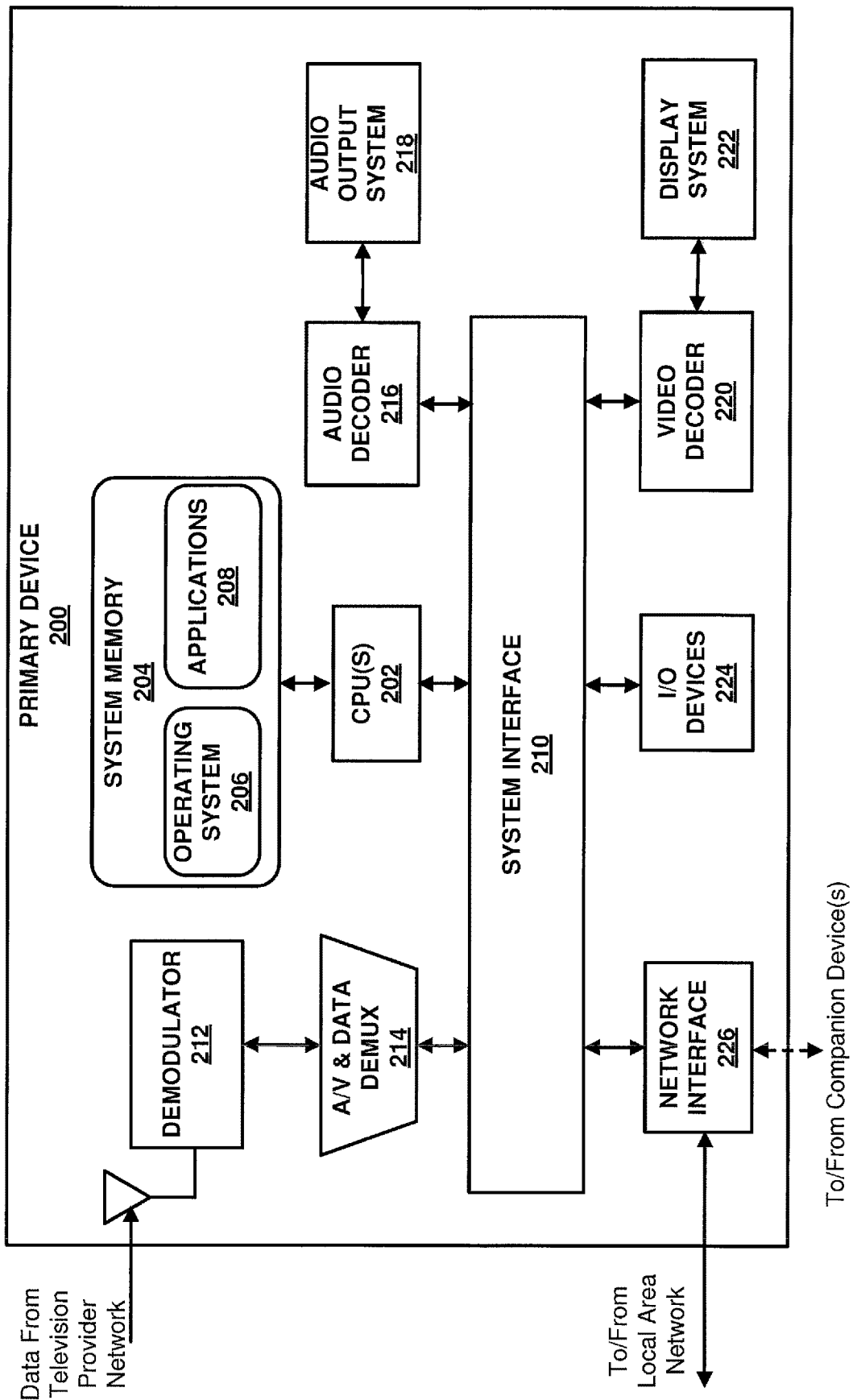
FIG. 2 is a block diagram illustrating an example of a primary device that may implement one or more techniques of this disclosure.

FIG. 2 is a block diagram illustrating an example of a primary device that may implement one or more techniques of this disclosure. Primary device 200 is an example of a computing device that may be configured to receive data from a communications network and allow a user to access multimedia content. In the example illustrated in FIG. 2, primary device 200 is configured to receive data via a television network, such as, for example, television service network 104 described above. Further, in the example illustrated in FIG. 2, primary device 200 is configured to send and receive data via a local area network and/or a wide area network. Primary device 200 may be configured to send data to and receive data from a companion device via a local area network or directly. It should be noted that in other examples, primary device 200 may be configured to simply receive data through a television service network 104 and send data to and/or receive data from (directly or indirectly) a companion device. The techniques described herein may be utilized by devices configured to communicate using any and all combinations of communications networks.

As illustrated in FIG. 2, primary device 200 includes central processing unit(s) 202, system memory 204, system interface 210, demodulator 212, A/V & data demux 214, audio decoder 216, audio output system 218, video decoder 220, display system 222, I/O device(s) 224, and network interface 226. As illustrated in FIG. 2, system memory 204 includes operating system 206 and applications 208. Each of central processing unit(s) 202, system memory 204, system interface 210, demodulator 212, A/V & data demux 214, audio decoder 216, audio output system 218, video decoder 220, display system 222, I/O device(s) 224, and network interface 226 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example primary device 200 is illustrated as having distinct functional blocks, such an illustration is for descriptive purposes and does not limit primary device 200 to a particular hardware architecture. Functions of primary device 200 may be realized using any combination of hardware, firmware and/or software implementations.

CPU(s) 202 may be configured to implement functionality and/or process instructions for execution in primary device 200. CPU(s) 202 may be capable of retrieving and processing instructions, code, and/or data structures for implementing one or more of the techniques described herein. Instructions may be stored on a computer readable medium, such as system memory 204 and/or storage devices. CPU(s) 202 may include single and/or multi-core central processing unit(s).

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of read only memories (ROM), electrically programmable memories (EPROM) or electrically erasable and programmable (EEPROM) memories. System memory 204 may be configured to store information that may be used by primary device 200 during operation. System memory 204 may be used to store program instructions for execution by CPU(s) 202 and may be used by programs running on primary device 200 to temporarily store information during program execution. Further, in the example where primary device 200 is included as part of a digital video recorder, system memory 204 may be configured to store numerous video files.

Applications 208 may include applications implemented within or executed by primary device 200 and may be implemented or contained within, operable by, executed by, and/or be operatively and/or communicatively coupled to components of primary device 200. Applications 208 may include instructions that may cause CPU(s) 202 of primary device 200 to perform particular functions. Applications 208 may include algorithms which are expressed in computer programming statements, such as, for-loops, while-loops, if-statements, do-loops, etc. Applications 208 may be developed using a specified programming language. Examples of programming languages include, Java™, Jini™, C, C++, Objective C, Swift, Perl, Python, PhP, UNIX Shell, Visual Basic, and Visual Basic Script. In the example where primary devices 200 includes a smart television, applications may be developed by a television manufacturer or a broadcaster. As illustrated in FIG. 2, applications 208 may execute in conjunction with operating system 206. That is, operating system 206 may be configured to facilitate the interaction of applications 208 with CPUs(s) 202, and other hardware components of primary device 200. Operating system 206 may be an operating system designed to be installed on set-top boxes, digital video recorders, televisions, and the like. It should be noted that techniques described herein may be utilized by devices configured to operate using any and all combinations of software architectures. In one example, operating system 206 and/or applications 208 may be configured to establish a subscription with a companion device and generate content information messages in accordance with the techniques described in detail below.

System interface 210 may be configured to enable communications between components of primary device 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express™ ("PCIe") bus specification, which is maintained by the Peripheral Component Interconnect Special Interest Group, or any other form of structure that may be used to interconnect peer devices (e.g., proprietary bus protocols).

As described above, primary device 200 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 2, demodulator 212 and A/V & data demux 214 may be configured to extract video, audio, and data from a transport stream. A transport stream may be defined according to, for example, DVB standards, ATSC standards, ISDB standards, DTMB standards, DMB standards, and DOCSIS standards. It should be noted that although demodulator 212 and A/V & data demux 214 are illustrated as distinct functional blocks, the functions performed by demodulator 212 and A/V & data demux 214 may be highly integrated and realized using any combination of hardware, firmware and/or software implementations. Further, it should be noted that for the sake of brevity a complete description of digital radio frequency (RF) communications (e.g., analog tuning details, error correction schemes, etc.) is not provided herein. The techniques described herein are generally applicable to digital RF communications techniques used for transmitting digital media content and associated content information.

In one example, demodulator 212 may be configured to receive signals from an over-the-air signal and/or a coaxial cable and perform demodulation. Data may be modulated according a modulation scheme, for example, quadrature amplitude modulation (QAM), vestigial sideband modulation (VSB), or orthogonal frequency division modulation (OFDM). The result of demodulation may be a transport stream. A transport stream may be defined according to a telecommunications standard, including those described above. An Internet Protocol (IP) based transport stream may include a single media stream or a plurality of media streams, where a media stream includes video, audio and/or data streams. Some streams may be formatted according to International Organization for Standardization (ISO) base media file formats (BMFF). An MPEG based transport stream may include a single program stream or a plurality of program streams, where a program stream includes video, audio and/or data elementary streams. In one example, a media stream or a program stream may correspond to a television program (e.g., a TV "channel") or a multimedia stream (e.g., an on demand unicast). A/V & data demux 214 may be configured to receive transport streams and/or program streams and extract video packets, audio packets, and data packets. That is, A/V and data demux 214 may apply demultiplexing techniques to separate video elementary streams, audio elementary streams, and data elementary streams for further processing by primary device 200.

Referring again to FIG. 2, packets may be processed by CPU(s) 202, audio decoder 216, and video decoder 220. Audio decoder 216 may be configured to receive and process audio packets. For example, audio decoder 216 may include a combination of hardware and software configured to implement aspects of an audio codec. That is, audio decoder 216 may be configured to receive audio packets and provide audio data to audio output system 218 for rendering. Audio data may be coded using multichannel formats such as those developed by Dolby and Digital Theater Systems. Audio data may be coded using an audio compression format. Examples of audio compression formats include MPEG formats, Advanced Audio Format (AAC) formats, Digital Theater System High Density (DTS-HD) formats, and AC-3 formats. Audio output system 218 may be configured to render audio data. For example, audio output system 218 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 220 may be configured to receive and process video packets. For example, video decoder 220 may include a combination of hardware and software used to implement aspects of a video codec. In one example, video decoder 220 may be configured to decode video data encoded according to any number of video compression standards, such as International Telecommunication Union (ITU) Telecommunication Standardization Sector (ITU-T) H.262 or ISO/IEC MPEG-2 Visual, ISO/IEC MPEG-4 Visual, ITU-T H.264 (also known as ISO/IEC MPEG-4 AVC), and High-Efficiency Video Coding (HEVC). Display system 222 may be configured to retrieve and process video data for display. For example, display system 222 may receive pixel data from video decoder 220 and output data for visual presentation. Further, display system 222 may be configured to output graphics in conjunction with video data, e.g., graphical user interfaces. Display system may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 224 may be configured to receive input and provide output during operation of primary device 200. That is, I/O device(s) 224 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 224 may be operatively coupled to primary device 200 using a standardized communication protocol, such as for example, Universal Serial Bus protocol (USB), Bluetooth, ZigBee or a proprietary communications protocol, such as, for example, a proprietary infrared communications protocol.

Network interface 226 may be configured to enable primary device 200 to send and receive data via a local area network and/or a wide area network. Further, network interface may be configured to enable primary device 200 to communicate with a companion device. Network interface 226 may include a network interface card, such as an Ethernet card, an optical transceiver, a radio frequency transceiver, or any other type of device configured to send and receive information. Network interface 226 may be configured to perform physical signaling, addressing, and channel access control according to the physical and Media Access Control (MAC) layers utilized in a network.

As described above, A/V & data demux 214 may be configured to extract data packets from a transport stream. Data packets may include content information. In another example, network interface 226 and in turn system interface 210 may extract the data packets. In this example the data packets may originate from a network, such as, local area network 114 and/or wide area network 116. As used herein, the term content information may refer generally to any information associated with services received via a network. Further, the term content information may refer more specifically to information associated with specific multimedia content. Data structures for content information may be defined according to a telecommunications standard. For example, ATSC standards describe Program and System Information Protocol (PSIP) tables which include content information. Types of PSIP tables include Event Information Tables (EIT), Extended Text Tables (ETT) and Data Event Tables (DET). In ATSC standards, DETs and EITs may provide event descriptions, start times, and durations. In ATSC standards, ETTs may include text describing virtual channels and events. Further, in a similar manner to ATSC, DVB standards include Service Description Tables, describing services in a network and providing the service provider name, and EITs including event names descriptions, start times, and durations. Primary device 200 may be configured to use these tables to display content information to a user (e.g., present an EPG).

In addition to or as an alternative to extracting tables from a transport stream to retrieve content information, as described above, primary device 200 may be configured to retrieve content information using alternative techniques. For example, ATSC 2.0 defines Non-Real-Time Content (NRTC) delivery techniques. NRTC techniques may enable a primary device to receive content information via a file delivery protocol (e.g., File Delivery over Unidirectional Transport (FLUTE) and/or via the Internet (e.g., using HTTP). Content information transmitted to a primary device according to NRTC may be formatted according to several data formats. One example format includes the data format defined in Open Mobile Alliance (OMA) Mobile Broadcast Services Enabler Suite (BCAST) Service Guide Version 1.0.1. In a similar manner, DVB standards define Electronic Service Guide (ESG) techniques which may be used for transmitting content information. A service guide may provide information about current and future service and/or content. Primary device 200 may be configured to receive content information according to NRTC techniques and/or ESG techniques. That is, primary device 200 may be configured to receive a service guide. In should be noted that the techniques described herein may be generally applicable regardless of how a primary device receives content information.

Figure 3:
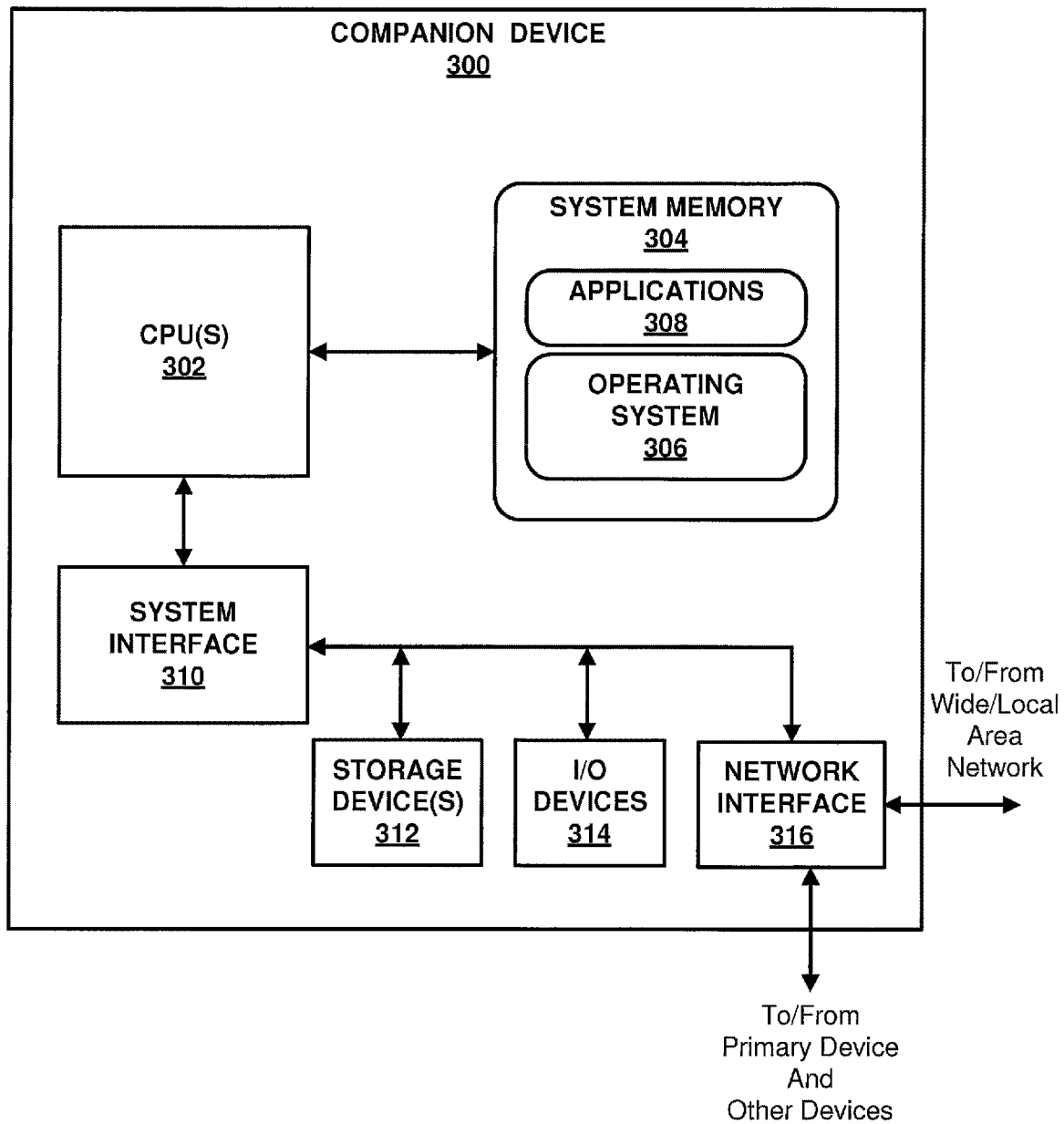
FIG. 3 is a block diagram illustrating an example of a companion device that may implement one or more techniques of this disclosure.

As described above, primary device 200 may be configured to send data to and receive data from a companion device via a local area network or directly. Further, primary device 200 may be configured to send data to and receive data from a companion device according to one or more communication techniques, e.g., defined communication flows. FIG. 3 is a block diagram illustrating an example of a companion device that may implement one or more techniques of this disclosure. Companion device 300 may include one or more processors and a plurality of internal and/or external storage devices. Companion device 300 is an example a device configured communicate with a primary device. For example, companion device 300 may be configured to receive content information from a primary device. Companion device 300 may include one or more applications running thereon that may utilize information included in a content information communication message. Companion device 300 may be equipped for wired and/or wireless communications and may include devices, such as, for example, desktop or laptop computers, mobile devices, smartphones, cellular telephones, personal data assistants, tablet devices, and personal gaming devices.

As illustrated in FIG. 3, companion device 300 includes central processing unit(s) 302, system memory 304, system interface 310, storage device(s) 312, I/O device(s) 314, and network interface 316. As illustrated in FIG. 3, system memory 304 includes operating system 306 and applications 308. It should be noted that although example companion device 300 is illustrated as having distinct functional blocks, such an illustration is for descriptive purposes and does not limit companion device 300 to a particular hardware or software architecture. Functions of companion device 300 may be realized using any combination of hardware, firmware and/or software implementations.

Each of central processing unit(s) 302, system memory 304, and system interface 310, may be similar to central processing unit(s) 202, system memory 204, and system interface 210 described above. Storage device(s) 312 represent memory of companion device 300 that may be configured to store larger amounts of data than system memory 304. For example, storage device(s) 312 may be configured to store a user's multimedia collection. Similar to system memory 304, storage device(s) 312 may also include one or more non-transitory or tangible computer-readable storage media. Storage device(s) 312 may be internal or external memory and in some examples may include non-volatile storage elements. Storage device(s) 312 may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive.

I/O device(s) 314 may be configured to receive input and provide output for companion device 300. Input may be generated from an input device, such as, for example, touch-sensitive screen, track pad, track point, mouse, a keyboard, a microphone, video camera, or any other type of device configured to receive input. Output may be provided to output devices, such as, for example, speakers or a display device. In some examples, I/O device(s) 314 may be external to companion device 300 and may be operatively coupled to companion device 300 using a standardized communication protocol, such as for example, Universal Serial Bus (USB) protocol.

Network interface 316 may be configured to enable companion device 300 to communicate with external computing devices, such as primary device 200 and other devices or servers. Further, in the example where companion device 300 includes a smartphone, network interface 316 may be configured to enable companion device 300 to communicate with a cellular network. Network interface 316 may include a network interface card, such as an Ethernet card, an optical transceiver, a radio frequency transceiver, or any other type of device that can send and receive information. Network interface 316 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, Bluetooth, ZigBee, and/or an IEEE standard, such as, one or more of the 802.11 standards, as well as various combinations thereof.

As illustrated in FIG. 3, system memory 304 includes operating system 306 and applications 308 stored thereon. Operating system 306 may be configured to facilitate the interaction of applications 308 with central processing unit(s) 302, and other hardware components of companion device 300. Operating system 306 may be an operating system designed to be installed on laptops and desktops. For example, operating system 306 may be a Windows (a registered trademark) operating system, Linux, or Mac OS. Operating system 306 may be an operating system designed to be installed smartphones, tablets, and/or gaming devices. For example, operating system 306 may be an Android, iOS, WebOS, Windows Mobile (a registered trademark), or a Windows Phone (a registered trademark) operating system. It should be noted that the techniques described herein are not limited to a particular operating system.

Applications 308 may be any applications implemented within or executed by companion device 300 and may be implemented or contained within, operable by, executed by, and/or be operatively and/or communicatively coupled to components of companion device 300. Applications 308 may include instructions that may cause central processing unit(s) 302 of companion device 300 to perform particular functions. Applications 308 may include algorithms which are expressed in computer programming statements, such as, for loops, while-loops, if-statements, do-loops, etc. Further, applications 308 may include second screen applications. Companion device 300 and/or applications 308 may be configured establish a subscription with a primary device, request content information with a primary device, and/or receive a content information message (e.g., a content message formatted according to any of the schemas described below), and parse content information for use in a second screen application according to the techniques described herein.

Figure 4:
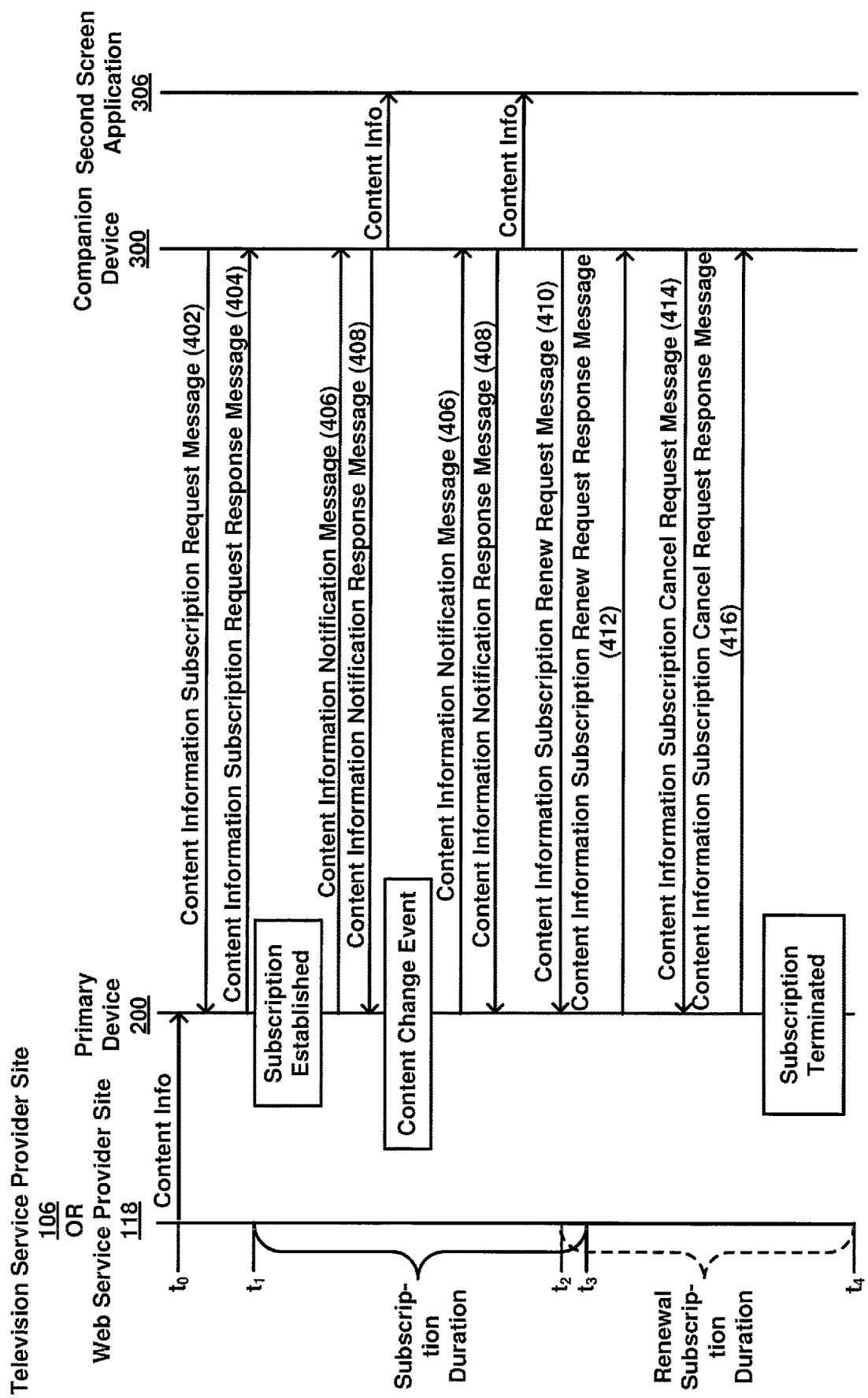
FIG. 4 is a conceptual diagram illustrating an example communications flow between a primary device and a companion device.

As described above, a primary device and a companion device may communicate directly or through a network. FIG. 4 is a conceptual diagram illustrating an example communications flow between a primary device and a companion device. In the example illustrated in FIG. 4, primary device 200 and companion device 300 exchange messages to establish a subscription, renew a subscription, and cancel a subscription. In the example illustrated in FIG. 4, a subscription is established between primary device 200 and companion device 300 and content information messages are exchanged during the subscription. As illustrated in FIG. 4, primary device 200 receives content information from television service provider site 106 or web service provider site 118. As described above, content information may include any information associated with services received via a network, information associated with specific multimedia content, and/or a service guide. During a subscription, primary device 200 and companion device 300 may exchange content information messages. As described in detail below, each of the messages exchanged between a primary device and a companion device may have a defined structure. That is, messages may be formatted according to a schema, where a schema may include a description of a file or document.

In the example illustrated in FIG. 4, companion device 300 initiates the establishment of a subscription by sending a content information subscription request message (402) to primary device 200. In one example, companion device 300 may send a content information subscription request message when content information is needed for use with an application. Examples of content information subscription request messages are described in detail below with respect to Table 1 and FIG. 5 to FIG. 8C. Upon receiving a content information subscription request message, primary device 200 sends a content information subscription request response message (404) to companion device 300. In some examples, this message may be referred to as a subscription response message. Examples of content information subscription request response messages are described in detail below with respect to Table 2 and FIG. 9 to FIG. 12B. As illustrated in FIG. 4, upon companion device 300 receiving a content information subscription request response message, a subscription is established between primary device 200 and companion device 300. As described in detail below, a subscription may continue for a specified duration or until a subscription is cancelled. Subscription durations are illustrated on the left of FIG. 4. In the example illustrated in FIG. 4, the initial duration of the subscription is equal to $t_3-t_1$.

After a subscription has been established, primary device 200 may send content information notification messages (406) to companion device 300. Examples of content information notification messages are described in detail below with respect to Tables 3A-3B and FIG. 13 to FIG. 20G. Further, examples of content information notification messages may include service guide information request response messages described in detail below with respect to Tables 10A-11 and FIGS. 54-55. It should be noted that in some examples, content information notification messages may be referred to as service and content identification messages. Further, it should be noted that in some examples, any combination of elements or attributes described with respect to a content information notification message or a service and content identification messages as part of a subscription may be included in an information request response message. In the example illustrated in FIG. 4, primary device 200 sends an initial content information notification message to companion device 300 subsequent to a subscription being established. Further, as illustrated in FIG. 4, primary device 200 sends a content information notification message to companion device 300 upon a content change event. For example, primary device 200 may send a content information notification message to companion device 300 when current content information or information associated with content changes. For example, a content change event may occur when a user tunes to a different channel or when television programming transitions from a main program to a commercial. As illustrated in FIG. 4, upon receipt of a content information notification message, companion device 300 sends a content information notification response message (408) to primary device 200. Examples of content information notification response messages are described in detail below with respect to Table 4 and FIG. 21 to FIG. 24C. It should be noted that in some examples, transmission of content information notification response messages may be optional. For example, in the case where a content notification message is repeated from primary device 200 to companion device 300, an explicit response acknowledging the receipt of the message may not be necessary.

In the example illustrated in FIG. 4, once a subscription is established, primary device 200 and companion device 300 may continue to exchange content information notification messages and, optionally, content information notification response messages until a subscription terminates. As described below, a subscription may terminate due to a subscription duration expiring and/or a subscription being cancelled. It should be noted that in some cases a subscription may terminate prematurely due to a power failure or the like. As illustrated in FIG. 4, prior to the expiration of the initial duration of the subscription, (i.e., prior to $t_3$), companion device 300 may send a content information subscription renew request message (410). Examples of content information subscription renew request messages are described in detail below with respect to Table 5 and FIG. 25 to FIG. 31C. Upon receiving a content information subscription renew request message, primary device 200 may send a content information subscription renew request response message (412). In some examples, this message may be referred to as a subscription renew response message. Examples of content information subscription renew request response messages are described in detail below with respect to Table 6 and FIG. 32 to FIG. 35B. In this manner, as illustrated in FIG. 4, the duration of a subscription may be extended (i.e., from $t_3$ to $t_4$ in the example of FIG. 4).

It should be noted that in some cases, a companion device 300 attempting to renew a subscription may send a content information subscription renew request message after a subscription duration has already expired. Further, in some cases, a primary device 200 may not receive a content information subscription renew request message until after a subscription duration has expired. In one example, primary device 200 may be configured to receive subscription renew request messages and renew a subscription after a subscription duration has expired. That is, in one example, a primary device 200 may provide a grace period for receiving subscription renew request messages. In this manner, there may be more opportunity for a subscription to be renewed. In one example, companion device 300 may be configured to send a new content information subscription request message, if a content information subscription renew request response message is not received within a predetermined amount of time.

In additional to a subscription terminating upon a subscription duration expiring, as illustrated in FIG. 4, companion device 300 may send a content information subscription cancel request message (414). Examples of content information subscription cancel request messages are described in detail below with respect to Table 7 and FIG. 36 to FIG. 45C. In some examples, a user of an application may cause a content information subscription cancel request message to be sent. For example, if an application displays information that a user finds distracting (e.g., content information overlaid on a television program), a user may terminate the display of the information, which may result in an application causing companion device 300 to send a subscription cancel request message. As illustrated in FIG. 4, upon receiving a content information subscription cancel request message, primary device 200 sends a content information cancel request response message (416) to companion device 300. In some examples this message may be referred to as a subscription cancel response message. Examples of content information subscription cancel request response messages are described in detail below with respect to Table 8 and FIG. 46 to FIG. 52C. In this manner, primary device 200 represents an example of a device configured to receive a subscription request message, transmit a content information subscription request response message, and transmit one or more content information notification message during a subscription and companion device 300 represents an example of a device configured to transmit a content information subscription request message, receive a content information subscription request response message, and receive one or more content information notification message during a subscription.

As described above with respect to FIG. 4, companion device 300 may be configured to send a content information subscription request message to a primary device. Table 1 provides example elements that may be included in an example content information subscription request message.

TABLE 1

Elements of a content information subscription request message

| Element Name | Description |
| --- | --- |
| ContentInfoSubscriptionCallbackURL | URL location or identifier to receive content information subscription message |
| ContentInfoSubscriptionDuration | Requested duration in number of milliseconds until the content information subscription expires. A special value of −1 indicates "infinite" duration. |
| CDDevID | Device identifier for the companion device |
| CDAppID | Application identifier for companion device |
| CDAppVersion | Version for companion device application |

As illustrated in Table 1, elements in a content information subscription request message may include ContentInfoSubscriptionCallbackURL, ContentInfoSubscriptionDuration, CDDevID, CDAppID, and/or CDAppVersion. A ContentInfoSubscriptionCallbackURL may specify a uniform resource locator. The specified ContentInfoSubscriptionCallbackURL may be used by a primary device, e.g., primary device 200, to provide content information (e.g., content information notification messages) to companion device 300. It should be noted that the underlying communication protocols used for providing content information through a ContentInfoSubscriptionCallbackURL may vary. For example, a primary device may be configured to provide content information using application layer protocols, for example, Hypertext Transfer Protocol (HTTP) or File Transfer Protocol (FTP). In one example, a primary device may be configured to invoke an HTTP POST request method using ContentInfoSubscriptionCallbackURL. In one example, a primary device may be configured to provide content information using lower layer protocols. For example, a primary device may be configured to provide content information using WebSocket protocol, Transmission Control Protocol (TCP), Internet Protocol (IP), and the like. The techniques described herein may be generally applicable regardless of the underlying communication protocols between a primary device and a companion device.

Referring again to Table 1, ContentInfoSubscriptionDuration may include a number data type that provides a value of a requested duration until a content information subscription expires (e.g., a number of milliseconds). In one example, ContentInfoSubscriptionDuration may specify a special value of −1 that indicates an infinite duration, where an infinite duration may be defined as until communications between a primary device and a companion device terminates and/or when an application requesting content information terminates. In some instances, it may be useful and/or necessary for a primary device to have information regarding the capabilities of a companion device. Elements CDDevID, CDAppID, and CDAppVersion are examples of elements that provide companion device information and may enable a primary device to identify a companion device and/or capabilities thereof. It should be noted that in some examples the inclusion of companion device information in a communication information subscription request message may be optional. In one example, a primary device and a companion device may exchange device information during a device discovery process and, as such, exchange of device information during establishment of a subscription may be redundant. CDDevID may include a device identifier (ID) for companion device 300 and in some examples may include a string. CDAppID may include an application identifier for companion device 300 and in some examples may include a string. CDAppVersion may include a version identifier for companion device 300 (a firmware version or application version) and/or a version of an application running thereon. In one example, CDAppVersion may include a number value. In another example, additionally, the version of the operating system of companion device (e.g. iOS 8.1 or Android 5.0) may also be included in the request. In one example, a primary device may be configured to customize content information notification messages based on companion device information. For example, if a companion device and/or an application running thereon does not utilize certain types of content information, a primary device may not include such information in a content information notification messages. For example, only a subset of elements may be included in a content information notification message based on a version of a companion device application. In this manner, when companion device 300 transmits a content information subscription request response message including the example elements illustrated in Table 1 to a primary device, companion device 300 provides a primary device sufficient information to establish a subscription.

Referring again to Table 1, each of the elements included in Table 1 may be included in a content information subscription request message according to a schema. FIG. 5 illustrates an example content information subscription request message according to a JSON schema. FIG. 6 is a computer program listing illustrating an example content information subscription request message payload according to the example schema illustrated in FIG. 5. As illustrated in the example of FIG. 6, a companion device may provide a Uniform Resource Locator (URL) of "http://192.168.0.100/CD/CI01" for element ContentInfoSubscriptionCallbackURL and may request to establish a subscription for a duration of 6400 milliseconds (i.e., ContentInfoSubscriptionDuration equals 6400). Further, in the example illustrated in FIG. 6, a companion device may provide the following companion device information: the companion device is identified as CDDevId0 (i.e., CDDevID equals "CDDevId0"), the companion application is identified as ID01 (i.e., CDAppID equals "ID01") and the version is 0.9 (i.e., CDAppVersion equals "0.9"). A primary device receiving the content information subscription request message illustrated in FIG. 6 may establish a subscription with the companion device based on these example parameters.

In addition to or as an alternative to using a JSON schema for a content information subscription request message, companion device 300 may be configured to generate a content information subscription request message using another type of schema. FIG. 7 is a computer program listing illustrating an example schema of an example content information subscription request message according to XML. Further, in one example, a Representative State Transfer (REST) mechanism may be used by companion device 300 to provide a content information subscription request message to a primary device. Further, HTTP request methods may be used by companion device 300 to provide a content information subscription request message to a primary device. FIGS. 8A-8C are computer program listings illustrating examples of content information subscription request messages according to HTTP request methods. FIG. 8A and FIG. 8B illustrate examples where a HTTP GET request is used to communicate a content information subscription request message including a ContentInfoSubscriptionCallbackURL of "http://192.168.0.100/CD/CI01" and a ContentInfoSubscriptionDuration of 6400 milliseconds. In the example illustrated in FIG. 8B, the value of ContentInfoSubscriptionCallbackURL is URL encoded when putting it in the HTTP GET query parameters. FIG. 8C illustrates an example where a HTTP POST request is sent from companion device 300 to a primary device to communicate a content information subscription request message including a ContentInfoSubscriptionCallbackURL of "http://192.168.0.100/CD/CI01" and a ContentInfoSubscriptionDuration of 6400 milliseconds. In the example illustrated in FIG. 8C, ContentInfoSubscriptionCallbackURL and ContentInfoSubscriptionDuration are URL encoded when putting them in the HTTP POST query parameters. In this manner, companion device 300 may be configured to provide communications to a primary device to initiate the establishment of a subscription.

As described above with respect to FIG. 4, upon receiving a content information subscription request message, primary device 200 may send a content information subscription request response message to a companion device. In some examples, this message may referred to as a subscription response message. Table 2 provides example elements that may be included in an example content information subscription request response message.

TABLE 2

Elements of a content information subscription request response message

| Element Name | Description |
| --- | --- |
| ContentInfoSubscriptionID | The subscription identifier for this content information subscription. ContentInfoSubscriptionID may be used to uniquely identify this subscription from companion device to the primary device. |
| ContentInfoSubscriptionTimeoutDuration | Actual duration in number of milliseconds until the content information subscription expires. A special value of −1 indicates "Infinite" duration. |
| PDDevID | Device identifier for the primary device |
| PDVersion | Version for primary device |

As illustrated in Table 2, elements in a subscription request response message may include ContentInfoSubscriptionID, ContentInfoSubscriptionTimeoutDuration, PDDevID, and/or PDVersion. A ContentInfoSubscriptionID may be used to uniquely identify a subscription between a primary device and a companion device. In one example, ContentInfoSubscriptionID may include a string. ContentInfoSubscriptionTimeoutDuration may include a number that provides a value of the actual duration until a content information subscription expires (e.g., a number of milliseconds). In one example, ContentInfoSubscriptionTimeoutDuration may specify a special value of −1 that indicates an infinite duration. In one example, ContentInfoSubscriptionTimeoutDuration may equal a ContentInfoSubscriptionDuration value provided in a content information subscription request message. That is, ContentInfoSubscriptionTimeoutDuration may act as a confirmation of ContentInfoSubscriptionDuration. In other examples, primary device 200 may be configured to provide a ContentInfoSubscriptionTimeoutDuration based on an adjustment to a ContentInfoSubscriptionDuration value. For example, primary device 200 may be configured to provide a ContentInfoSubscriptionTimeoutDuration that is greater than or equal to a ContentInfoSubscriptionDuration value. In one example, the timeout duration may begin from the time the content information subscription request response message is transmitted from the primary device. For example, primary device 200 may provide a ContentInfoSubscriptionTimeoutDuration including a grace period in order to provide a companion device additional time to request that a subscription be renewed.

Similar to that described above with respect to CDDevID, CDAppID, and CDAppVersion, in some instances, it may be useful and/or necessary for a companion device to have information regarding the capabilities of primary device 200. Elements PDDevID and PDVersion are examples of elements that may enable a companion device to identify primary device 200 and/or capabilities thereof. PDDevID may include a device identifier for primary device 200 and in some examples may include a string. PDVersion may include a version identifier for primary device 200 (a firmware version or application version). In one example, PDVersion may include a number value. In another example, additionally, the version of the operating system of primary device (e.g. Android 2.2 or Linux 3.16.0-34-generic) may also be included in the request. In this manner, when primary device 200 transmits a content information subscription request response message including the example elements illustrated in Table 2 to a companion device, primary device 200 and a companion device establish a subscription.

Referring again to Table 2, each of the elements included in Table 2 may be included in a content information subscription request response message according to a defined schema. FIG. 9 illustrates an example content information subscription request response message according to a JSON schema. FIG. 10 is a computer program listing illustrating an example content information subscription request response message payload according to the example schema illustrated in FIG. 9. As illustrated in the example of FIG. 10, primary device 200 may provide "CINFOR9887" for element ContentInfoSubscriptionID and may provide a subscription duration of 6400 milliseconds (i.e., ContentInfoSubscriptionTimeoutDuration equals 6400). As described above, the value of ContentInfoSubscriptionTimeoutDuration may confirm a ContentInfoSubscriptionDuration. In the example illustrated in FIG. 10, primary device 200 specifies the following primary device information: the primary device is identified as PDDevId0 (i.e., PDDevID equals PDDevId0) and the version is 1.0 (i.e., PDVersion equals 1.0). In this manner, a companion device and/or an application running thereon receiving the content information subscription request response message illustrated in FIG. 10 may expect to receive content information messages for a duration of 6400 milliseconds. As described above with respect to Table 1, content information messages may be transmitted during a subscription using a ContentInfoSubscriptionCallBackURL.

In addition to or as an alternative to using a JSON schema for a content information communication subscription request response message, primary device 200 may be configured to generate a content information subscription request response message using another type of schema. FIG. 11 is a computer program listing illustrating an example content information subscription request response message according to an XML schema. Further, in one example, a REST mechanism may be used by primary device 200 to provide a content information subscription request response message to a companion device. In one example, primary device 200 may provide a content information subscription request response message in response to a HTTP GET or HTTP POST REST request from a companion device. For example, primary device 200 may provide a response to a content information subscription request message described above with respect to FIGS. 8A-8C. FIGS. 12A and 12B are computer program listings illustrating examples of content information subscription request response messages. FIG. 12A and FIG. 12B illustrate respective examples where HTTP responses are used to communicate a content information subscription request response message including a ContentInfoSubscriptionID of "CINFO9887" and a ContentInfoSubscriptionTimeoutDuration of 6400 milliseconds. Further, as illustrated in FIGS. 12A-12B a PDDevID of PDDevId01 and a PDVersion of 1.0 are provided. In the example illustrated in FIG. 12A, the HTTP response body includes XML data which conforms to the example schema provided above with respect to FIG. 11. In the example illustrated in FIG. 12B, the HTTP response body includes JSON data which conforms to the example schema provided above with respect to FIG. 9. In another example, instead of JSON, JSON with padding (JSONP) may be used. In another example, an HTTP response body may include data in another format, such as, for example, Comma Separated Values (CSV), Backus-Naur Form (BNF), Augmented Backus-Naur Form (ABNF), or Extended Backus-Naur Form (EBNF). In this manner, primary device 200 may be configured to provide communications to a companion device to establish a subscription.

As described above, with respect to FIG. 4, once a subscription is established, primary device 200 may send content information notification messages to a companion device. Table 3A provides example elements that may be included in an example content information notification message. A content information notification message may include elements and optionally attributes. It should be noted that in some cases the distinction between an element and an attribute may be arbitrary, depending on the application. In some instances, a content information notification messages may be referred to as a content information communication message and/or a content identification communication message. Table 3A provides examples of elements that may be used to compose a content information notification message. With respect to Table 3A, Cardinality with a value of x . . . y means the number of the presented instances of this element or attribute is in the range from x to y, inclusive. Further, with respect to Table 3A, Data Type indicates a particular kind of data item, as defined by the range of allowed values. Further, with respect to Table 3A, Type indicates if a particular element or attribute is an element or if it is an attribute.

TABLE 3A

Elements in a content information notification message

| Element Name | Type (E = element or A = attribute) | Cardinality | Description | Data Type |
|---|---|---|---|---|
| notificationID | E | 1 | The unique ID for this notification from PD to CD. Used for uniquely identifying this notification. | string |
| ContentInfoSubcriptionID | E | 1 | The subscription identifier for this content information subscription. ContentInfoSubscriptionID may be used to uniquely identify this subscription from companion device to the primary device. | string |
| serviceID | E | 1 | The service ID for currently running service In one example the service ID may include information about a major channel number and minor channel number for the service. | string |
| programID | E | 1 | The program ID. A Program is a temporal segment of a service and/or channel. | string |
| showID | E | 1 | The show ID. Show is a playout of a program. | string |
| segmentID | E | 1 . . . N | The segment ID. A show consists of one or more show segments. Contains following attributes cTime sType | string |
| cTime | A | 1 | current time location within the segment. | dateTime |
| sType | A | 0 . . . 1 | Segment type Value of 0 indicates show segment Value of 1 indicates interstitial segment (e.g., commercial) Values 2-255 are reserved | unsignedByte |
| Name | E | 1 . . . N | Name of the show possibly in multiple languages. The language is expressed using built-in XML attribute 'xmh:lang' with this element. | string |
| Description | E | 0 . . . N | Description, possibly in multiple languages. The language is expressed using built-in XML attribute 'xml:lang' with this element. | string |
| CARatings | E | 1 | Content advisory ratings (parental ratings) for the show or content. In another example instead of a string data type multiple elements, sub-elements and attributes may be used to represent the CARatings element. In one example, the content advisory rating is indicated for each rating region. For each rating region rating value is provided for one or more rating dimensions. | string |

TABLE 3A-continued

Elements in a content information notification message

| Element Name | Type (E = element or A = attribute) | Cardinality | Description | Data Type |
|---|---|---|---|---|
| Components | E | 0 ... N | Individual content components within the show and/or content. Contains the following attributes CARatings componentType componentRole componentName componentID componentURL componentdeviceCapabilities | |
| Components | E | 0 ... N | Individual content components within the show and/or content. Contains the following attributes CARatings componentType componentRole componentName componentID componentURL componentdeviceCapabilities | |
| CARatings | E | 0 ... 1 | Content advisory ratings (parental ratings) for the component. In another example instead of a string data type multiple elements, sub-elements and attributes may be used to represent the CARatings element. In one example, for each component the content advisory rating is indicated for each rating region. For each rating region rating value is provided for one or more rating dimensions. | string |
| componentType | A | 1 | Type of the component (e.g. audio, video, closed caption, etc.) Value of 0 indicates an audio component Value of 1 indicates a video component Value of 2 indicated a closed caption component Value of 3 indicates an application component Value of 4 indicates a metadata component Values 5 to 255 are reserved | unsignedByte |
| componentRole | A | 1 | Role or kind of the component. In one example the componentRole may be defined as follows: For audio (when componentType attribute above is equal to 0): values of componentRole attribute are as follows: 0 = Complete main, 1 = Music and Effects, 2 = Dialog, 3 = Commentary, 4 = Visually Impaired, 5 = Hearing Impaired, 6 = Voice-Over, 7-254 = reserved, 255 = unknown. | unsignedByte |

TABLE 3A-continued

Elements in a content information notification message

| Element Name | Type (E = element or A = attribute) | Cardinality | Description | Data Type |
|---|---|---|---|---|
| componentRole | A | 1 | For Video (when componentType attribute above is equal to 1) values of componentRole attribute are as follows:<br>0 = Primary video,<br>1 = Alternative camera view,<br>2 = Other alternative video component,<br>3 = Sign language inset,<br>4 = Follow subject video,<br>5 = 3D video left view,<br>6 = 3D video right view,<br>7 = 3D video depth information,<br>8 = Part of video array <x, y> of <n, m>,<br>9 = Follow-Subject metadata,<br>10-254 = reserved,<br>255 = unknown.<br>For Closed Caption component (when componentType attribute above is equal to 2) values of componentRole attribute are as follows:<br>0 = Normal,<br>1 = Easy reader,<br>2-254 = reserved,<br>255 = unknown.<br>When componentType attribute above is between 5 to 255, inclusive, the componentRole shall be equal to 255. | unsignedByte |
| componentName | A | 0 . . . 1 | Human readable name of the component | string |
| @componentID | A | 1 | Component identifier | string |
| componentURL | A | 1 . . . N | Uniform resource locator address to access the component | anyURI |
| NRTContentItems | E | 0 . . . N | Non real-time content items (files, data elements) available for the show and/or content. Contains the following elements<br>NRTItemLocation<br>NRTItemID<br>NRTItemname<br>NRTcontentType<br>NRTcontentEncoding | |
| NRTItemLocation | A | 1 | Uniform resource locator address and/or other location information to access the NRT file or data. | anyURI |
| NRTItemID | A | 1 | Non real-time item's (file and/or data) identifier | string |
| NRTItemName | A | 1 | Non real-time item's (file and/or data) name | string |
| NRTContentType | A | 1 | Non real-time item's (file and/or data) content-type. Obeys the semantics of Content-Type header of HTTP/1.1 protocol RFC 2616. | string |
| NRTContentEncoding | A | 1 | Non real-time item's (file and/or data) content-encoding. Obeys the semantics of Content-Encoding header of HTTP/1.1 protocol RFC 2616 | string |

In the example illustrated in Table 3A, elements in a content information notification message may be classified as message identifying elements (i.e., notificationID, and ContentInfoSubcriptionID), content identifying elements (i.e., serviceID, programID, showID, segementID, cTime, sType, Name, Description, and CARatings), content component elements (i.e., CARatings, componentType, componentRole, componentName, componentID, componentURL, and componentdeviceCapabilities), and non real-time content elements (NRTItemLocation, NRTItemID, NRTItemname, NRTcontentType, NRTcontentEncoding). Message identifying elements may uniquely identify a particular content information notification message. ContentInfoSubcriptionID may be similar to ContentInfoSubscriptionID described above with respect to Table 2. NotificationID may uniquely identify a particular notification. It should be noted that although illustrated as a string in the example of Table 3A, in some examples, notificationID may include a number value. In some examples, primary device 200 may be configured to sequentially number subsequent notificationID values. In this manner, a companion device may be able to determine if content information notification messages are not received or received out of sequence. Content identifying elements may provide information with respect to a particular item of content, e.g., a television program being presented on a primary device. Content component elements may identify additional content associated with a particular item of content. For example, a second screen application may be configured to use content identifying elements to identify and/or verify content that is currently being rendered by a primary device. Further, a second screen application may be configured to use component information to provide an enhanced and/or alternative presentation of content. For example, a second screen application may use component information to provide an alternative rendering of content. For example, if primary device 200 is rendering a primary audio track of a television program, a second screen application may be configured to use component elements to retrieve (e.g., using a componentURL) and render a secondary audio track (e.g., commentary, alternative language, etc.). It should be noted that although Table 3A shows the data type for componentRole as unsignedByte in another example the data type for componentRole may be a string, that is, the various componentRole values may be encoded as strings. Non real-time content elements may be similar to content components and identify content associated with a particular item of content. For example, non real-time items of content may include a coupon associated with an advertisement being rendered on a primary device.

Figure 13:
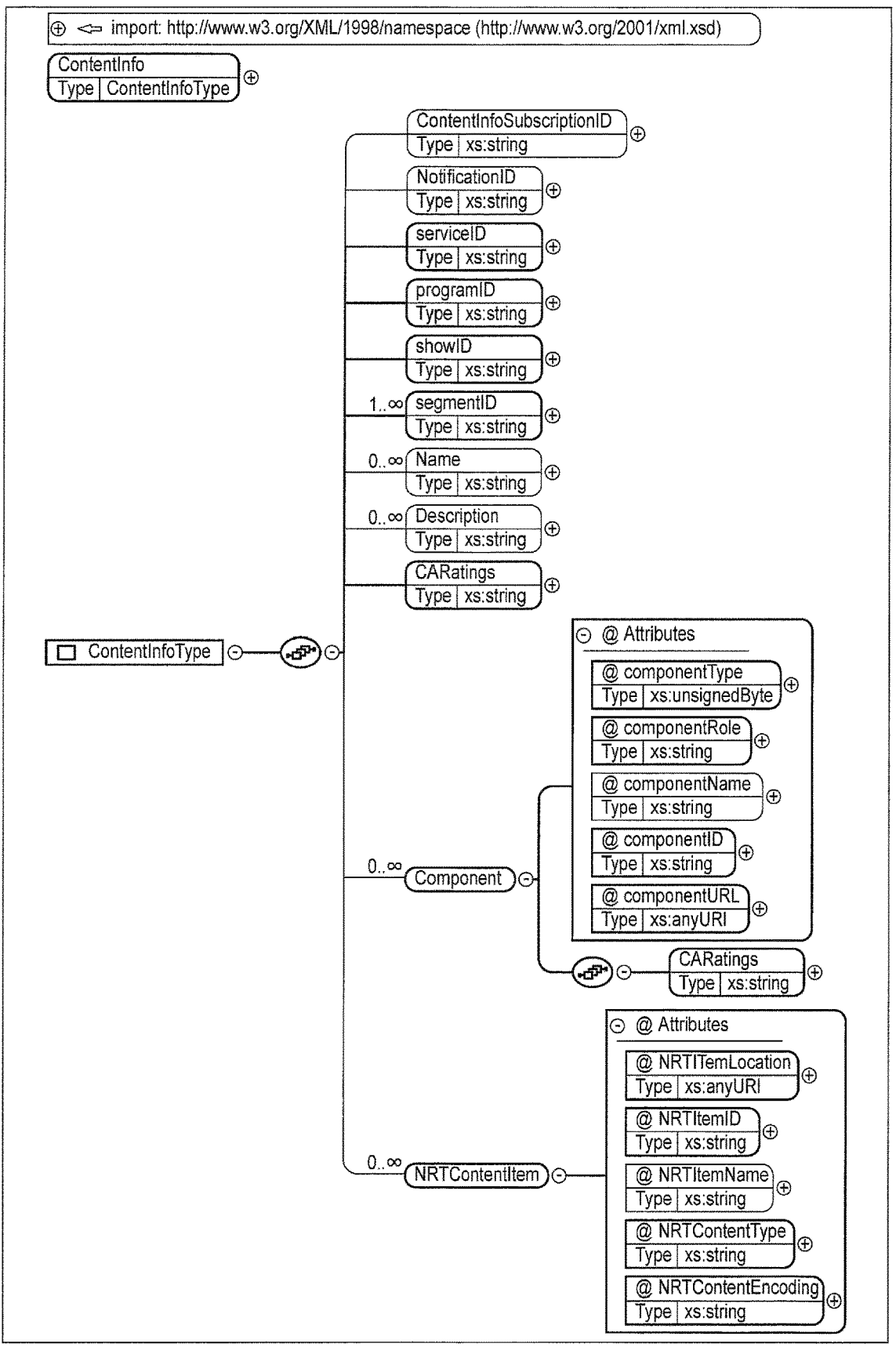
FIG. 13 is a conceptual diagram illustrating an example structure of an example content information notification message.

Referring again to Table 3A, each of the elements may be included in a content information notification message according to a defined structure. FIG. 13 is a conceptual diagram illustrating an example structure of an example content information communication message. Primary device 200 may use a structure to create a content information communication notification message according to a schema. FIG. 14 is a computer program listing illustrating an example schema of an example content information communication message according to JSON. FIG. 15 is a computer program listing illustrating an example content information notification message payload according to the example schema illustrated in FIG. 14. As illustrated in FIG. 15, the payload may include a subscription identifier (i.e., "ContentInfoSubscriptionID" value of "CINFO9887") and a notification identifier (i.e., "notificationID" value of "587"), which may enable a companion device to uniquely identify the message. As illustrated in FIG. 15, the item of content is the program Power Lunch (i.e., "Name" value of "Power Lunch"). In the example illustrated in FIG. 15 the program is associated with enhanced content. That is, as illustrated in FIG. 15, a video component (i.e., "componentName" value of "Current Stock Market Trends") may be available at the componentURL and a video (i.e., "NRTItemName" value of "2014 Stock Market Overview,") may be available at NRTItemLocation. In this manner, a companion device receiving the content information notification message illustrated in FIG. 15 may render either of the videos in conjunction with a primary device rendering the main program.

Figure 17:
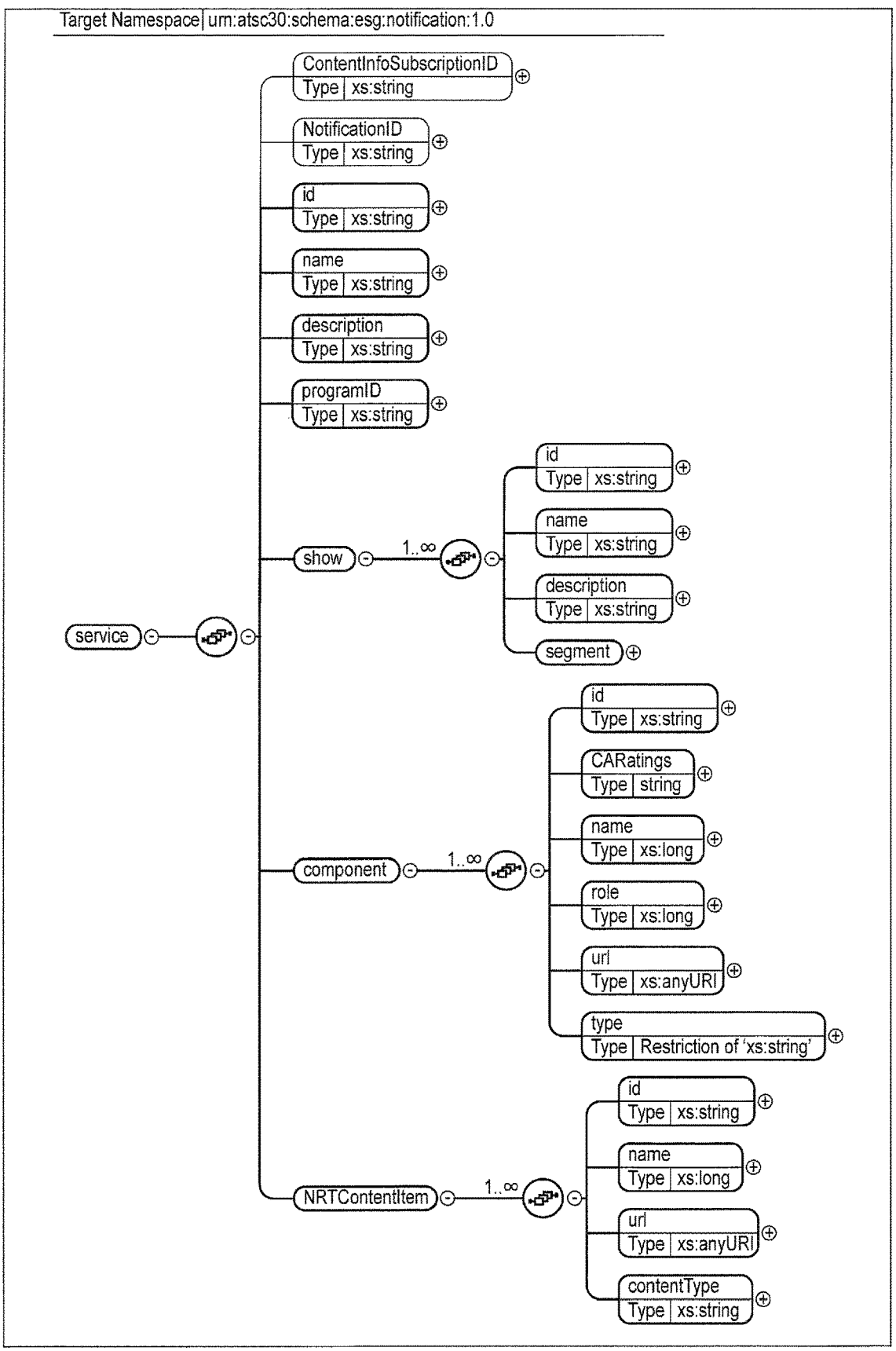
FIG. 17 is a conceptual diagram illustrating an example structure of an example content information notification message.

In addition to or as an alternative to using a JSON schema for a content information notification message, primary device 200 may be configured to generate a content information notification message according to another type of schema. FIG. 16 is a computer program listing illustrating an example schema of an example content information notification message according to XML. Further, in addition to or as an alternative to formatting a content information notification message according to the structure illustrated in FIG. 13, primary device 200 may be configured to format a content information notification message according to another structure. FIG. 17 is a conceptual diagram illustrating an example structure of an example content information notification message. It should be noted that the structure illustrated in FIG. 17, includes component values as elements, instead of attributes as illustrated in the example of FIG. 13 and Table 3A. This may allow a device to logically nest some elements as sub-elements of other elements, thus making it easier to parse. FIG. 18 is a computer program listing illustrating an example schema of an example content information notification message according to JSON based on the structure illustrated in FIG. 17. FIGS. 19A-19B is a computer program listing illustrating an example schema of an example content information communication message according to XML based on the structure illustrated in FIG. 17.

Further, in one example, a Representative State Transfer (REST) mechanism may be used by primary device 200 to provide a content information notification message to a companion device. Further, HTTP request methods may be used by primary device 200 to provide a content information notification messages to a primary device. FIGS. 20A-20C are computer program listings illustrating examples of content information notification messages according to HTTP request methods. FIG. 20A and FIG. 20B illustrate examples where primary device 200 uses an HTTP GET request to communicate a content information notification message. In the examples illustrated in FIG. 20A and FIG. 20B, for a notification identified as 587 (i.e., notificationID equal to "587"), a ServiceID equal to "CNBC," a Name equal to "Power Lunch," and a ProgramID equal to "123" are provided. FIG. 20C illustrates an example where primary device 200 uses an HTTP POST request to communicate a content information notification message. In the example illustrated in FIG. 20C the payload described above with respect to FIG. 15 is provided in an HTTP POST request. In this manner, primary device 200 may be configured to provide content information to a companion device during a subscription.

As described above, content information notification messages may be referred to as service and content identification messages. Various example elements that may be included in a service and content identification message from primary device to companion device and their respective descriptions are illustrated in Table 3B. It should be noted that it may be useful to compare Table 3B to Table 3A. For example, Table 3B includes additional elements with respect to signaling service information and includes target user profile information for each of a service and content. Further, Table 3B provides an alternative manner in which elements associated with content are nested. It should be noted that in Table 3B OMA BCAST service guide may refer to an Open Mobile Alliance (OMA) BCAST Service Guide. Examples of OMA BCAST Service Guides are described below with respect to Tables 9A-9C. It should be noted that in Table 3B a URI refers to a Universal Resource Identifier (URI) which may include a string of characters used to a identify a resource. The rules of syntax for a URI may be defined according to a published document including, for example, Request for Comment (RFC) documents developed by the Internet Engineering Task Force (IETF).

TABLE 3B

Elements in a service and content identification message

| Element Name | Cardinality | Data type | Description |
|---|---|---|---|
| MessageBody | 1 | | |
| Service | 1....N | | Service root element |
|   id | 1 | string | Service ID as specified in id attribute in Service fragment of ATSC 3.0 or OMA BCAST service guide. |
|   ServiceType | 1 | integer | Service type as specified in ServiceType element in Service fragment of ATSC 3.0 or OMA BCAST service guide. |
|   Name | 1...N | object | Service name as specified in Name element in Service fragment of ATSC 3.0 or OMA BCAST service guide. |
|   Description | 0...N | object | Service description as specified in Description element in Service fragment of ATSC 3.0 or OMA BCAST service guide. |
|   TargetUserProfile | 0...N | object | Target user profile as specified in TargetUserProfile element in Service fragment of ATSC 3.0 or OMA BCAST service guide. |
| Content | 0...N | | Content fragment's root element. |
|   Programid | 1 | string | Content ID as specified in id attribute in Content fragment of ATSC 3.0 or OMA BCAST service guide. |
|   Name | 1...N | object | Content name as specified in Name element in Content fragment of ATSC 3.0 or OMA BCAST service guide. |
|   Description | 0...N | object | Content description as specified in Description element in Content fragment of ATSC 3.0 or OMA BCAST service guide. |
|   TargetUserProfile | 0...N | object | Target User Profile as specified in TargetUserProfile element in Service fragment of ATSC 3.0 or OMA BCAST service guide. |
|   CARatings | 1 | string | Content advisory ratings for the content as specified in ContentAdvisoryRatings element in Content fragment of ATSC 3.0 or OMA BCAST service guide. |
|   Capabilities | 1 | string | Required capabilities as specified in element in Content fragment of ATSC 3.0 or OMA BCAST service guide. |
|   Component | 1...N | | |
|     componentID | 1 | string | Component identifier |
|     componentType | 1 | unsigned Byte | Type of the component (e.g. audio, video, closed caption, etc.). 0 indicates an audio component. 1 indicates a video component. 2 indicates a closed caption component. 3 indicates an application component. Values 4 to 255 are reserved. |
|     componentRole | 1 | string | Role or kind of the component |
|     componentName | 0...1 | string | Human readable name of the component |
|     Component Location | 0...1 | String (URI) | URL for access to the component. It can be noted that PD is not required to stream and/or transmit any component to CD. |
|   FileContentItem | 0...N | | |
|     FileContentItemLocation | 1 | String (URI) | URL to access the file content item. |
|     FileContentItemName | 0...1 | string | Human readable name of the file content item |
|     FileContentItemID | 1 | string | File content item identifier |
|     FileContentItemType | 1 | string | File content item's content-type. Obeys the semantics of Content-Type header of HTTP/1.1 RFC 7231. RFC 7231 is available at https://tools.ietf.org/html/rfc7231 and is incorporated herein by reference. |
|     FileContentItemEncoding | 1 | string | File content item's content-encoding. Obeys the semantics of Content-Encoding header of HTTP/1.1 RFC 7231. RFC 7231 is available at https://tools.ietf.org/html/rfc7231 and is incorporated herein by reference. |
|   TimelineInfo | | | |
|     currentTime | 1 | date-time | Time location in the content. |
|     Location | 0...1 | String (URI) | URL for access to the content. |

With respect to the example illustrated in Table 3B, data types used for various syntax are shown in a column titled "data type". In one example, the data types may correspond to defined JSON data types. As illustrated in the example of Table 3B, for a service (represented by "Service" element in Table 3B), a service name is provided via syntax element "Name" under element "Service". It should be noted that since the service name may be provided in different languages at the same time, in the example illustrated in Table 3B, a data type of "object" is used for each item of Name array. Each of these items may include a syntax element "text" of data type string providing service name and an optional syntax element "lang" which indicates language of the service name text. When the optional syntax element "lang" is not included a default value of English language may be inferred. As illustrated in the example of Table 3B, for a service, a service description is provided via syntax "Description." It should be noted that since the service description may be provided in different languages at the same time, a data type of "object" is used for each item of Description array. Each of these items may include a syntax element "text" of data type string providing service description text and an optional syntax element "lang" which indicates language of the service description text. When the optional syntax element "lang" is not included a default value of English language may be inferred. As illustrated in the example of Table 3B, for a content (represented by "Content" element in Table 3B), a content name is provided via syntax element "name" under element "Content". It should be noted that since the content name may be provided in different languages at the same time, a data type of "object" is used for each item of Name array. Each of these items may include a syntax element "text" of data type string providing content name and an optional syntax element "lang" which indicates language of the content name text. When the optional syntax element "lang" is not included a default value of English language may be inferred. As illustrated in the example of Table 3B, for a content, service description is provided via syntax "Description" under element "Content". It should be noted that since the content description may be provided in different languages at the same time, a data type of "object" is used for each item of Description array. Each of these items can contain a syntax element "text" of data type string providing content description text and an optional syntax element "lang" which indicates language of the content description text. When the optional syntax element "lang" is not included a default value of English language may be inferred. It should be noted that with respect to Table 3B, in one example RFC 2616 may be used in-place of RFC 7231 when coding FileContentItemType and FileContentItemEncoding. RFC 2616 is available at https://tools.ietf.org/html/rfc7231 and is incorporated herein by reference. In one example, JSON may be used to carry a service and content identification message based on the example illustrated in Table 3B. One example of a JSON schema that may be used for a service and content identification message illustrated in FIGS. 20D-20G.

As described above, with respect to FIG. 4, upon receiving a content information notification message, companion device 300 may be configured to send a content information notification response message to a primary device. Table 4 provides example elements that may be included in an example content information notification response message. A content information notification response message may enable a primary device to confirm that a content information notification message was received by companion device 300. As described above, the use of a content information notification message may be optional. For example, when communication between a primary device and a companion device is determined to be reliable, primary device 200 and/or companion device 300 may be configured to determine that the use of content information notification message is unnecessary.

TABLE 4

Elements of a content information notification response message

| Element Name | Description |
| --- | --- |
| ContentInfoSubscriptionID | The subscription identifier for this content information subscription. ContentInfoSubscriptionID may be used to uniquely identify this subscription from companion device to the primary device. |
| notificationID | The notification ID in the PD notification for which this CD response is being sent. |
| CDDevID | Device identifier for companion device. |
| CDAppID | Application identifier of the companion device. |
| CDAppVersion | Version of the companion device. |

As illustrated in Table 4, elements in a content information notification message may include ContentInfoSubscriptionID, notificationID, CDDevID, CDAppID, and CDAppVersion. ContentInfoSubscriptionID is described above with respect to Table 2, notificationID is described above with respect to Table 3A and each of CDDevID, CDAppID, and CDAppVersion are described above with respect to Table 1. It should be noted that in some examples each of ContentInfoSubscriptionID, CDDevID, CDAppID, and CDAppVersion may be optional. For example, a content information notification response message may include only a notificationID. That is, a primary device may be configured to confirm that a content information notification message was received by companion device 300 by receiving a content information notification message including a notificationID.

Each of the elements included in Table 4 may be included in a content information notification response message according to a defined schema. FIG. 21 is a computer program listing illustrating an example content information notification response message according to a JSON schema. FIG. 22 is a computer program listing illustrating an example content information notification response message payload according to the example schema illustrated in FIG. 21. As illustrated in FIG. 22, the payload may provide the following information in a content information notification response message: the subscription identified is CINFO9877 (i.e., ContentInfoSubscriptionID equals "CINFO9887"), the notification is identified as 587 (i.e., notificationID equals "587") the companion device is identified as CDDevId0 (i.e., CDDevID equals "CDDevId0"), the companion application is identified as ID01 (i.e., CDAppID equals "ID01") and the version is 0.9 (i.e., CDAppVersion equals "0.9"). A primary device receiving the content information notification response message illustrated in FIG. 22 may confirm that a content information notification identified as 587 was received by a companion device. In addition to or as an alternative to using a JSON schema for a content information notification response message, companion device 300 may be configured to generate a content information notification response message using another type of schema. FIG. 23 is a computer program listing illustrating an example of content information notification response message according to an XML schema.

Further, in one example, a REST mechanism may be used by companion device 300 to provide a content information notification response message to a primary device. In one example, companion device 300 may provide a content information notification response message in response to a HTTP GET or HTTP POST REST request from a primary device. For example, companion device 300 may provide a content information notification response message in response to a content information notification message described above with respect to FIGS. 20A-20C. FIGS. 24A-24C are computer program listings illustrating examples of content information subscription request response messages. FIG. 24A illustrates an example where a content information notification response message includes an HTTP OK response. FIG. 24B illustrates an example where an HTTP response is used to communicate a content information notification response message including a ContentInfoSubscriptionID of "CINFO9887" and a notificationID of 587. Further, as illustrated in FIG. 24B a CDDevID of CDDevId01, a CDAppID of ID01, and a CDAppVersion of 0.9 are provided. In the example provided in FIG. 24B, the HTTP response body includes XML data which conforms to the example schema provided above with respect to FIG. 23. In the example provided in FIG. 24C, the HTTP response body includes JSON data which conforms to the example schema provided above with respect to FIG. 21. In another example, instead of JSON, JSONP (JSON with padding) may be used. In another example, an HTTP response body may include data in another format, such as, CSV, BNF, ABNF, or EBNF. In this manner, companion device 300 may be configured to provide a confirmation to a primary device that content information has been received.

As described above with respect to FIG. 4, companion device 300 may be configured to send a content information subscription renew request message to a primary device. Table 5 provides example elements that may be included in an example content information subscription renew request message.

TABLE 5

Elements of a subscription renew request message

| Element Name | Description |
| --- | --- |
| ContentInfoSubscriptionID | The subscription identifier for this content information subscription. ContentInfoSubscriptionID may be used to uniquely identify this subscription from companion device to the primary device. |
| ContentInfoSubscriptionDuration | Requested duration in number of milliseconds until the content information subscription expires. A special value of −1 indicates "Infinite" duration. |
| CDDevID | Device identifier for the companion device |
| CDAppID | Application identifier for companion device |
| CDAppVersion | Version for companion device |

As illustrated in Table 5, elements in a content information subscription renew request message may include ContentInfoSubscriptionID, ContentInfoSubscriptionDuration, CDDevID, CDAppID, and CDAppVersion. ContentInfoSubscriptionID is described above with respect to Table 2, and ContentInfoSubscriptionDuration, CDDevID, CDAppID, and CDAppVersion are described above with respect to Table 1. Thus, a content information subscription renew request message may be similar to a content information subscription request message described above with the addition of a ContentInfoSubscriptionID element identifying a subscription to be renewed. It should be noted that in some examples companion device information may be optional. Further, in some examples, ContentInfoSubscriptionCallbackURL, described above with respect to Table 1, may be included in a content information subscription renew request message. Further, as described in detail below, in some examples, a value of zero may be provided for ContentInfoSubscriptionDuration to indicate that companion device 300 is requesting cancellation of a subscription. Thus, in some examples, a renew request and a cancel request may be combined into one message type, where a non-zero value for ContentInfoSubscriptionDuration indicates a renew request and a zero value for ContentInfoSubscriptionDuration indicates a cancel request.

Each of the elements included in Table 5 may be included in a content information subscription renew request message according to a defined schema. Each of FIG. 25 and FIG. 27 are respective computer program listings illustrating an example content information subscription renew request message according to a JSON schema. As illustrated in FIG. 25, the example schema includes each of the elements included in Table 5. As illustrated in FIG. 27, in addition to including each of the elements included in Table 5, the example schema includes a ContentInfoSubscriptionCallbackURL element. It should be noted that in some examples, ContentInfoSubscriptionCallbackURL may have a different value than a ContentInfoSubscriptionCallbackURL value included in a content information subscription request message. In this manner, companion device 300 may be able to change a ContentInfoSubscriptionCallbackURL by sending a content information subscription renew request to a primary device.

FIG. 26 is a computer program listing illustrating an example content information subscription renew request message payload according to the example schema illustrated in FIG. 25. FIG. 28 is a computer program listing illustrating an example content information subscription renew request message payload according to the example schema illustrated in FIG. 27. As respectively illustrated in the examples of FIG. 26 and FIG. 28, a companion device may request to renew a subscription identified as CINFO9887 (i.e., ContentInfoSubscriptionID equals CINFO9887) for a duration of 7200 milliseconds (i.e., ContentInfoSubscriptionDuration equals 7200) and further provide the following companion device information: the companion device is identified as CDDevId0 (i.e., CDDevID equals "CDDevId0"), the companion application is identified as ID01 (i.e., CDAppID equals "ID01") and the version is 0.9 (i.e., CDAppVersion equals "0.9"). Further, as illustrated in FIG. 28, a companion device may provide a URL of "http://192.168.0.100/CD/CI01" for element ContentInfoSubscriptionCallbackURL. A primary device receiving either of the content information subscription renew request messages illustrated in FIG. 26 and FIG. 28 may renew a subscription with the companion device based on these example parameters.

In addition to or as an alternative to using a JSON schema for a content information subscription renew request communication message, companion device 300 may be configured to generate a content information renew request message using another type of schema. FIG. 29 and FIG. 30 are respective computer program listings illustrating example content information subscription renew request messages according to an XML schema. As illustrated in FIG. 29, the example schema includes each of the elements included in Table 5. As illustrated in FIG. 30, in addition to including each of the elements included in Table 5, the example schema includes a ContentInfoSubscriptionCallbackURL element.

Further, in one example, a Representative State Transfer (REST) mechanism may be used by companion device 300 to provide a content information subscription renew request message to a primary device. FIGS. 31A-31C are computer program listings illustrating examples of content information subscription renew request messages according to HTTP request methods. FIG. 31A and FIG. 31B illustrate examples where a HTTP GET request is used to communicate a content information subscription renew request message for a duration of 7200 milliseconds (i.e., ContentInfoSubscriptionDuration equals 7200) for a subscription identified as CINFO9887 (i.e., ContentInfoSubscriptionID equals CINFO9887). FIG. 31C illustrates an example where a HTTP POST request is used to communicate a content information subscription renew request message for a duration of 7200 milliseconds (i.e., ContentInfoSubscriptionDuration equals 7200) for a subscription identified as CINFO9887 (i.e., ContentInfoSubscriptionID equals CINFO9887). In this manner, companion device 300 may be configured to provide communications to a primary device to extend the duration of a subscription.

As described above with respect to FIG. 4, upon receiving a content information subscription renew request message, primary device 200 may be configured to send a content information subscription renew request response message to a companion device. In some examples this message may be referred to as a subscription renew response message. Table 6 provides example elements that may be included in an example content information subscription renew request response message.

TABLE 6

Element of a content information subscription renew request response message

| Element Name | Description |
|---|---|
| ContentInfoSubscriptionID | The subscription identifier for this content information subscription. ContentInfoSubscriptionID may be used to uniquely identify this subscription from companion device to the primary device. |
| ContentInfoSubscriptionTimeoutDuration | Actual duration in number of milliseconds until the content information subscription expires. A special value of −1 indicates "Infinite" duration. |
| PDDevID | Device identifier for the primary device |
| PDVersion | Version for primary device |

As illustrated in Table 6, elements in a subscription renew request response message may include ContentInfoSubscriptionID, ContentInfoSubscriptionTimeoutDuration, PDDevID, and PDVersion. ContentInfoSubscriptionID, ContentInfoSubscriptionTimeoutDuration, PDDevID, and PDVersion are described above with respect to Table 2. Thus, a content information subscription renew request message may be similar to a content information subscription request message described above. It should be noted that in some examples primary device information may be optional. Further, in some examples, ContentInfoSubscriptionCallbackURL, described above with respect to Table 1, and ContentInfoSubscriptionTimeoutDuration, described above with respect to Table 5, may be included in a content information subscription renew request response message.

Each of the elements included in Table 6 may be included in a content information subscription renew request response message according to a defined schema. FIG. 32 illustrates an example content information subscription renew request response message according to a JSON schema. FIG. 33 is a computer program listing illustrating an example content information subscription renew request response message payload according to the example schema illustrated in FIG. 32. As illustrated in the example of FIG. 33, primary device 200 may provide a subscription renewal duration of 7200 milliseconds (i.e., ContentInfoSubscriptionTimeoutDuration equals 7200) for a subscription identified as CINFOR9887 (i.e., ContentInfoSubscriptionID equals "CINFOR9887"). In the example illustrated in FIG. 33, primary device 200 specifies the following primary device information: the primary device is identified as PDDevId0 (i.e., PDDevID equals PDDevId0) and the version is 1.0 (i.e., PDVersion equals 1.0). In this manner, a companion device and/or an application running thereon receiving the content information subscription renew request response message illustrated in FIG. 33 may expect to receive content information messages for an additional duration of 7200 milliseconds.

In addition to or as an alternative to using a JSON schema for a content information communication subscription request renew response message, primary device 200 may be configured to generate a content information subscription renew request response message using another type of schema. FIG. 34 is a computer program listing illustrating an example content information subscription renew request response message according to an XML schema. Further, in one example, a REST mechanism may be used by primary device 200 to provide a content information subscription renew request response message to a companion device. In one example, primary device 200 may provide a content information subscription renew request response message in response to a HTTP GET or HTTP POST REST request from a companion device. For example, primary device 200 may provide a response to a content information subscription renew request message described above with respect to FIGS. 31A-31C. FIG. 35A and FIG. 35B are computer program listings illustrating examples of content information subscription renew request response messages. FIG. 35A and FIG. 35B illustrate respective examples where HTTP responses are used to communicate a content information subscription renew request response message including a ContentInfoSubscriptionID of "CINFO9887" and a ContentInfoSubscriptionTimeoutDuration of 7200 milliseconds. Further, as illustrated in FIG. 35A and FIG. 35B a PDDevID of PDDevId01 and a PDVersion of 1.0 are provided. In the example illustrated in FIG. 35A, the HTTP response body includes XML data which conforms to the example schema provided above with respect to FIG. 34. In the example illustrated in FIG. 35B, the HTTP response body includes JSON data which conforms to the example schema provided above with respect to FIG. 32. In another example, instead of JSON, JSONP (JSON with padding) may be used. In another example, an HTTP response body may include data in another format, such as, CSV, BNF, ABNF, or EBNF. In this manner, primary device 200 may be configured to provide a confirmation to a companion device that a subscription has been renewed.

As described above with respect to FIG. 4, companion device 300 may send a content information subscription cancel request message to a primary device. Table 7 provides example elements that may be included in an example content information subscription cancel request message.

TABLE 7

Elements of a content information subscription cancel request message

| Element Name | Description |
|---|---|
| ContentInfoSubscriptionID | The subscription identifier for this content information subscription. ContentInfoSubscriptionID may be used to uniquely identify this subscription from companion device to the primary device. |
| CDDevID | Device identifier for the companion device |
| CDAppID | Application identifier for companion device |
| CDAppVersion | Version for companion device |

As illustrated in Table 7, elements in a subscription cancel request message may include ContentInfoSubscriptionID, CDDevID, CDAppID, and CDAppVersion. ContentInfoSubscriptionID is described above with respect to Table 2. CDDevID, CDAppID, and CDAppVersion are described above with respect to Table 1. In one example, companion device information may be optional. Further, in some examples, ContentInfoSubscriptionDuration and/or ContentInfoSubscriptionCallbackURL, described above with respect to Table 1, may be included in a content information subscription cancel request message. In the example where a content ContentInfoSubscriptionDuration is included in a content information subscription cancel request message, a value of zero may be provided for ContentInfoSubscriptionDuration to indicate that companion device 300 is requesting cancellation of a subscription. As described above, with respect to Table 5, in the case where a ContentInfoSubscriptionDuration value of zero is used to indicate that a companion device 300 is requesting cancellation of a subscription, a content information subscription cancel request message may be a special case of a content information subscription renew request message.

Each of the elements included in Table 7 may be included in a content information subscription cancel request message according to a defined schema. Each of FIG. 36, FIG. 38, and FIG. 40 are respective computer program listings illustrating an example content information subscription cancel request message according to a JSON schema. As illustrated in FIG. 36, the example schema includes only the ContentInfoSubscriptionID elements included in Table 7. As illustrated in FIG. 38, the example schema includes each of the elements included in Table 7. As illustrated in FIG. 40, in addition to including each of the elements included in Table 7, the example schema includes a ContentInfoSubscriptionDuration element. FIG. 37 is a computer program listing illustrating an example content information subscription cancel request message payload according to the example schema illustrated in FIG. 36. FIG. 39 is a computer program listing illustrating an example content information subscription cancel request message payload according to the example schema illustrated in FIG. 38. FIG. 41 is a computer program listing illustrating an example content information subscription cancel request message payload according to the example schema illustrated in FIG. 40. As respectively illustrated in the examples of FIG. 37, FIG. 39, and FIG. 40, a companion device may request to cancel a subscription identified as CINFO9887 (i.e., ContentInfoSubscriptionID equals CINFO9887). Further, as illustrated in FIG. 39 the companion device is identified as CDDevId0 (i.e., CDDevID equals "CDDevId0"), the companion application is identified as ID01 (i.e., CDAppID equals "ID01") and the version is 0.9 (i.e., CDAppVersion equals "0.9"). Further, as illustrated in FIG. 41, a value of zero is provided for ContentInfoSubscriptionDuration. A primary device receiving a content information subscription cancel request message illustrated in FIG. 37, FIG. 39, or FIG. 41 may cancel a subscription with the companion device.

In addition to or as an alternative to using a JSON schema for a content information subscription cancel request communication message, companion device 300 may be configured to generate a content information cancel request message using another type of schema. FIG. 42, FIG. 43, and FIG. 44 are respective computer program listings illustrating an example content information subscription cancel request messages according to an XML schema. As illustrated in FIG. 42, the example schema includes only the ContentInfoSubscriptionID elements included in Table 7. As illustrated in FIG. 43, the example schema includes each of the elements included in Table 7. As illustrated in FIG. 44, in addition to including each of the elements included in Table 7, the example schema includes a ContentInfoSubscriptionDuration element.

Further, in one example, a Representative State Transfer (REST) mechanism may be used by companion device 300 to provide a content information subscription cancel request message to a primary device. FIGS. 45A-45C are computer program listings illustrating examples of content information subscription cancel request messages according to HTTP request methods. FIG. 45A and FIG. 45B illustrate examples where a HTTP GET request is used to communicate a content information subscription cancel request message for a subscription identified as CINFO9887 (i.e., ContentInfoSubscriptionID equals CINFO9887). FIG. 45C illustrates an example where a HTTP POST request is used to communicate a content information subscription cancel request message for a subscription identified as CINFO9887 (i.e., ContentInfoSubscriptionID equals CINFO9887). In this manner, companion device 300 may be configured to provide communications to a primary device to cancel a subscription.

As described above with respect to FIG. 4, upon receiving a content information subscription cancel request message, primary device 200 may send a content information subscription cancel request response message to a companion device. In some examples, this message may be referred to as a subscription cancel response message. Table 8 provides example elements that may be included in an example content information subscription cancel request response message.

TABLE 8

Elements of a content information subscription cancel request response message

| Element Name | Description |
| --- | --- |
| CICancelStatusCode | A success or failure indication status code indicating the status of cancel subscription request |
| CICancelStatusString | A success or failure indication status string indicating the status of cancel subscription request |
| PDDevID | Device identifier for the primary device |
| PDVersion | Version for primary device |

As illustrated in Table 8, elements in a subscription cancel request response message may include CICancelStatusCode, CICancelStatusString, PDDevID, and PDVersion. In one example, CICancelStatusCode may include a number value indicating whether a subscription was successfully cancelled. For example, a CICancelStatusCode value of 200 may indicate that a subscription was successfully cancelled. In one example, values other than 200 for CICancelStatusCode may indicate that a subscription was not successfully cancelled, e.g., a value of −1. CICancelStatusString may include a string value indicating whether a subscription was successfully cancelled or may specify an error condition. For example, a CICancelStatusString value of "OK" may indicate that a subscription was successfully cancelled. In one example, error conditions may include messages, such as, "Invalid subscription ID" and other messages indicating why an error occurred. PDDevID and PDVersion are described above with respect to Table 2. In some examples, primary device information may be optional. In addition to including the elements in Table 8, one or more of ContentInfoSubscriptionID, ContentInfoSubscriptionTimeoutDuration, ContentInfoSubscriptionDuration, and ContentInforSubscriptionCallbackURL, described above, may be included in a content information subscription cancel request response.

Each of the elements included in Table 8 may be included in a content information subscription cancel request response message according to a defined schema. Each of FIG. 46 and FIG. 48 are respective computer program listings illustrating an example content information subscription cancel request response message according to a JSON schema. As illustrated in FIG. 46, the example schema includes each of the elements included in Table 8. As illustrated in FIG. 48, the example schema includes only the CICancelStatusCode and CICancelStatus elements included in Table 8. FIG. 47 is a computer program listing illustrating an example content information subscription cancel request response message payload according to the example schema illustrated in FIG. 46. FIG. 49 is a computer program listing illustrating an example content information subscription cancel request response message payload according to the example schema illustrated in FIG. 48. As illustrated in the examples of FIG. 45 and FIG. 47, primary device 200 may provide confirmation of cancellation (i.e., CICancelStatusCode equals 200 and CICancelStatus equal OK) for a subscription identified as CINFOR9887 (i.e., ContentInfoSubscriptionID equals "CINFOR9887"). In the example illustrated in FIG. 47, primary device 200 specifies the following primary device information: the primary device is identified as PDDevId0 (i.e., PDDevID equals PDDevId0) and the version is 1.0 (i.e., PDVersion equals 1.0). In this manner, a companion device and/or an application running thereon receiving a content information subscription cancel request response message illustrated in FIG. 45 or FIG. 47 may have confirmation that a subscription has been cancelled.

In addition to or as an alternative to using a JSON schema for a content information communication subscription request cancel response message, primary device 200 may be configured to generate a content information subscription renew request response message using another type of schema. Each of FIG. 50 and FIG. 51 are respective computer program listings illustrating an example content information subscription cancel request response message according to an XML schema. As illustrated in FIG. 50, the example schema includes each of the elements included in Table 8. As illustrated in FIG. 51, the example schema includes only the CICancelStatusCode and CICancelStatus elements included in Table 8.

Further, in one example, a REST mechanism may be used by primary device 200 to provide a content information subscription cancel request response message to a companion device. In one example, primary device 200 may provide a content information subscription renew request response message in response to a HTTP GET or HTTP POST REST request from a companion device. For example, primary device 200 may provide a response to a content information subscription cancel request message described above with respect to FIGS. 45A-45C. FIG. 52A, FIG. 52B, and FIG. 52C are computer program listings illustrating examples of content information subscription cancel request response messages. FIG. 52A illustrates an example where an HTTP response is used to communicate a content information subscription cancel request response message including a CICancelStatusCode and CICancelStatus. In the example illustrated in FIG. 52B, the HTTP response body includes XML data which conforms to the example schema provided above with respect to FIG. 51. In the example illustrated in FIG. 52C, the HTTP response body includes JSON data which conforms to the example schema provided above with respect to FIG. 46. In another example, instead of JSON, JSONP (JSON with padding) may be used. In another example, an HTTP response body may include data in another format, such as, CSV, BNF, ABNF, or EBNF. In this manner, primary device 200 may be configured to provide a confirmation to a companion device that a subscription has been cancelled.

As described above, in some cases a companion device and/or an application running thereon may require service guide data and in some cases, it may be inefficient for a companion device to download service guide data from a server. FIG. 53 is a conceptual diagram illustrating an example communications flow between a primary device and a companion device. In the example illustrated in FIG. 53, primary device 200 and companion device 300 exchange messages such that content information messages including service guide data may be provided from primary device 200 to companion device 300. As illustrated in FIG. 53, primary device 200 receives service guide data from television service provider site 106 or web service provider site 118. As described above, service guide data may include service guide data defined according a data format, such as, for example, DVB ESG formats and/or the data format defined in Open Mobile Alliance (OMA) BCAST Service Guide Version 1.0.1. As described in detail below, each of the messages exchanged between a primary device and a companion device may have a defined structure. That is, messages may be formatted according to a schema.

In the example illustrated in FIG. 53, companion device 300 initiates the transmission of service guide data by sending a service guide information request message (5302) to a primary device 200. In one example, companion device 300 may send a service guide information request message when service guide information is needed for use with an application. Examples of service guide information request messages are described in detail below with respect to Tables 9A-9C. Upon receiving a service guide information request message, primary device 200 sends a service guide information request response message (5304) to companion device 300. Examples of service guide information request response messages are described in detail below with respect to Tables 10A-11.

As described above, companion device 300 may be configured to initiate the exchange of service guide data by sending a service guide information request message to a primary device. Tables 9A-9C provide example elements that may be included in an example service guide information request message.

TABLE 9A

| | | Elements of an service guide information request message | | |
|---|---|---|---|---|
| Element Name | Type (E = element or A = attribute) | Cardinality | Description | Data Type |
| serviceID | E | 1 | The service ID for service for which ESG information is requested (e.g. This may include Major channel number, minor channel number) | string |

TABLE 9A-continued

Elements of an service guide information request message

| Element Name | Type (E = element or A = attribute) | Cardinality | Description | Data Type |
|---|---|---|---|---|
| programID | E | 1 . . . N | The program ID for which ESG information is requested. A Program is a temporal segment of a service and/or channel. | string |
| componentID | E | 1 . . . N | The component identifier for which ESG information is requested. | string |

As illustrated in Table 9A, elements in a service guide information request message may include serviceID, programID, and componentID. In one example, serviceID may include a string identifying a service for which companion device 300 requests service guide information. In one example, serviceID may include a major channel number and/or a minor channel number. In one example the serviceID may instead be indicated by two separate elements: a major channel number and a minor channel number. In one example, serviceID in Table 9A may be similar to serviceID described above with respect to Table 3A. In one example, programID may include a string identifying a program for which companion device 300 requests service guide information. In one example, a program may be defined as a temporal segment of a service or channel. In one example programID in Table 9A may be similar to programID described above with respect to Table 3A. In one example, componentID may include a string identifying a component for which companion device 300 requests service guide information. In one example, componentID in Table 9A may be similar to componentID described above with respect to Table 3A. In one example, a service guide information request message may include companion device information. For example, a service guide information request message may include one or more of elements CDDevID, CDAppID, and CDAppVersion described above.

In addition to including the elements in include in Table 9A, in some examples a service guide information request message may include additional elements. Table 9B illustrates an example where a service guide information request messages includes addition elements.

TABLE 9B

Elements of an service guide information request message

| Element Name | Type (E = element or A = attribute) | Cardinality | Description | Data Type |
|---|---|---|---|---|
| serviceID | E | 1 | The service ID for service for which ESG information is requested (e.g. This may include Major channel number, minor channel number) | string |
| programID | E | 1 | The program ID for which ESG information is requested. A Program is a temporal segment of a service and/or channel. | string |
| showID | E | 1 | The show ID for which ESG information is requested. Show is a playout of a program. Contains the following element: segmentID. | string |
| segmentID | E | 1 . . . N | The segment ID for which ESG information is requested. A show consists of one or more show segments. Contains following attributes cTime sType | string |
| cTime | A | 1 | Current time location within the segment. | dateTime |
| sType | A | 0 . . . 1 | Segment type Value of 0 indicates show segment Value of 1 indicates interstitial segment Values 2-255 are reserved | unsignedByte |
| contentID | E | 1 . . . N | The program ID for which ESG information is requested. Content may be a program. | string |
| componentID | E | 1 . . . N | The component identifier for which ESG information is requested. | string |

As illustrated in Table 9B, in addition to including elements serviceID, programID, and componentID described above with respect to Table 9A, elements in a service guide information request message may include showID, segmentID, cTime, sType, and contentID. In one example, showID may identify a show for which companion device 300 request service guide information. In one example, a show may be defined as a particular playout of a program. In one example, showID may contain cTime and sType attributes. In one example, showID may include a string. In one example, showID in Table 9B may be similar to showID described above with respect to Table 3A. In one example, segmentID may identify a segment for which companion device 300 request service guide information. In one example, a segment may be defined as a portion of a show. In one example, segmentID may contain cTime and sType attributes. In one example, segmentID may include a string. In one example, segmentID in Table 9B may be similar to segmentID described above with respect to Table 3A. In the example illustrated in Table 9B, cTime may indicate the current time location within a segment. In one example, cTime in Table 9B may be similar to cTime described above with respect to Table 3A. In the example illustrated in Table 9B, sType may indicate the type of segment. In one example, sType may include an unsigned byte value, where a value of zero indicates a show segment (e.g., a main program) and a value of one indicates an interstitial segment (e.g., a commercial break). In one example, sType in Table 9B may be similar to sType described above with respect to Table 3A. In one example, contentID may include a string identifying a program for which companion device 300 requests service guide information. It should be noted that contentID may identify a program in a different manner than that of programID. For example, ProgramID may identify non real-time (NRT) content where as ContentID may identify linear content. In another example, the ProgramID and ContentID may be same and in which case only one of the two may be included.

In some cases in addition to receiving service guide information for a current content (e.g., television content currently being rendered by a primary device), it may be useful for a companion device to receive service guide data for additional content. For example, in may be useful for a companion device to have service guide information for shows associated with different services and/or shows available during an upcoming time period. Table 9C provides an example element that may be included in a service guide information request message that may enable companion device 300 to request service guide information for a current show or additional service guide information.

As illustrated in Table 9C, elements in a service guide information request message may include an ESGRequestType. ESGRequestType may identify a type of service guide data request for companion device 300. In the example illustrated in Table 9C, ESGRequestType may be an integer and an ESGRequestType value equal to one may indicate that only the current show service guide information is requested and an ESGRequestType value equal to 0 may indicate that all service guide information is requested. It should be noted that the current show service guide information may include elements included in Table 9A and/or elements included in Table 9B. In addition to specifying a request for only the current show service guide information or all service information, ESGRequestType may include other types of service guide data requests. For example, a value of two may indicate a request for all service guide data associated with a service (e.g., a television network). Further, a value of three may indicate a request for all service guide data associated with an upcoming time period (e.g., the next three hours).

Each of the elements included in Tables 9A-9C may be included in a service guide request message according to a defined schema. In other examples, an example schema may include each of the elements include in Table 9B and/or Table 9C.

Further, in one example, a REST mechanism may be used by companion device 300 to provide a service guide information request message to a primary device. Further, HTTP request methods may be used by companion device 300 to provide a service guide information request message to a primary device. For example, a HTTP GET request may be used to communicate an service guide information request message including a serviceID equal to "CNBC", a programID equal to "123", and a componentID equal to "1234567." In one example, a HTTP POST request is sent from companion device 300 to a primary device to communicate a serviceID equal to "CNBC," a programID equal to "123," and a componentID equal to "1234567." In this manner, companion device 300 represents an example of a device configured to transmit a service guide information request message.

As described above with respect to FIG. 53, upon receiving a service guide information request message, primary device 200 may send a service guide information request response message to a companion device. In some examples, this message may be referred to as a service guide information response message. In one example, a service guide information request response message may include elements that indicate the service guide information included in a service guide information request response message. That is, a service guide information request response message may confirm identifying information received in a service guide information request message. Table 10A and Table 10B provide example elements that may be included in an

TABLE 9C

Elements of an service guide information request message

| Element Name | Type (E = element or A = attribute) | Cardinality | Description | Data Type |
|---|---|---|---|---|
| ESGRequestType | E | 1 | ESGRequestType equal to 1 indicates only the current show ESG information is requested. ESGRequestType equal to 0 indicates all ESG information is requested. ESGRequestType equal to 2 and greater are reserved for future use. | Int | example service guide information request response message. Each of the elements included in Table 10A and Table 10B may respective confirm the identifying elements described above with respect to Table 9B and Table 9C. It should be noted that in some examples, a service guide information request response message may include elements indicating a success or a failure. For example, a service guide information request response message may include a message indicating that the requested service guide information is unavailable. In another example, a service guide information request response message may include a message indicating that the requesting entity does not have sufficient privileges to obtain the ESG information. Further, in some examples, companion device information (e.g. CDDevID, CDAppID, and CDAppVersion) and/or primary device information (e.g., PDDevID, and/or PDVersion) may be included in a service guide information request response message. In one example, companion device information and/or primary device information may be used for security purposes.

TABLE 10A

Elements of an service guide information request response message

| Element Name | Type (E = element or A = attribute) | Cardinality | Description | Data Type |
|---|---|---|---|---|
| serviceID | E | 1 | The service ID for service for which ESG information is included in the response. (e.g. This may include Major channel number, minor channel number) | string |
| programID | E | 1 | The program ID for which ESG information is included in the response. A Program is a temporal segment of a service and/or channel. | string |
| showID | E | 1 | The show ID for which ESG information is requested. Show is a playout of a program. Contains the following element: segmentID. | string |
| segmentID | E | 1 . . . N | The segment ID for which ESG information is included in the response. A show consists of one or more show segments. Contains following attributes cTime sType | string |
| cTime | A | 1 | Current time location within the segment. | dateTime |
| cTime | A | 1 | Current time location within the segment. | dateTime |
| sType | A | 0 . . . 1 | Segment type Value of 0 indicates show segment Value of 1 indicates interstitial segment Values 2-255 are reserved | unsignedByte |
| contentID | E | 1 . . . N | The program ID for which ESG information is included in the response. Content may be a program. | string |
| componentID | E | 1 . . . N | The component identifier for which ESG information is included in the response. | string |

As illustrated in Table 10A, elements in a service guide information request response message may include serviceID, programID, componentID, showID, segmentID, cTime, sType, and contentID. Each of serviceID, programID, componentID, showID, segmentID, cTime, sType, and contentID are describe above with respect to Table 9B.

TABLE 10B

Elements of a service guide information request response message

| Element Name | Type (E = element or A = attribute) | Cardinality | Description | Data Type |
|---|---|---|---|---|
| ESGResponseType | E | 1 | ESGResponseType equal to 1 indicates only the current show ESG information is included in | Int |

TABLE 10B-continued

Elements of a service guide information request response message

| Element Name | Type (E = element or A = attribute) | Cardinality | Description | Data Type |
|---|---|---|---|---|
| | | | the response. ESGResponseType equal to 0 indicates all ESG information is included in the response. ESGResponseType equal to 2 and greater are reserved for future use. | |

As illustrated in Table 10B, elements in a service guide information request response message may include ESGResponseType. ESGResponseType is described above with respect to Table 9C. In one example, in addition to including elements that indicate the service guide information included in a service guide information request response message, a service guide information request response message may include encapsulated service guide data. For example, OMA BCAST Service Guide Version 1.0.1 defines fragments of data, where a fragment of data corresponds to a separate well-formed XML document. OMA BCAST Service Guide Version 1.0.1 includes the following defined fragments: Service, Schedule, Content, Access, SessionDescription, PurchaseItem, PurchaseDate, PurchaseChannel, PreviewData, InteractivityData, and ServiceGuideDeliveryDescriptor. In one example, primary device 200 may form a service guide information request response message by respectively encapsulating one or more fragments. In one example, primary device 200 may be configured to form a service guide information request response message by respectively encapsulating one or more of Service, Schedule, and Content fragments.

Primary device 200 may encapsulate one or more of Service, Schedule, and Content fragments based on a service guide information request information. That is, primary device 200 may only encapsulate fragments associated with requested items of service guide information. As described in OMA BCAST Service Guide Version 1.0.1, the Service fragment describes at an aggregate level the content items which comprise a broadcast service and other service level information, the Schedule fragment defines the timeframes in which associated content items are available for streaming, downloading and/or rendering, and the Content fragment gives a detailed description of a specific content item.

Table 11 provides an example of elements that may be included in a service guide information request response message. Each of the elements included in Table 11 respectively correspond to each of a Service fragment, a Schedule fragment, and a Content fragment of service guide. As illustrated in Table 11, a PDservice element may encapsulate a Service fragment, a PDcontent element may encapsulate a Content fragment, and a PDschedule element may encapsulate a Schedule fragment.

TABLE 11

Elements of an ESG information request response message

| Element Name | Type (E = element or A = attribute) | Cardinality | Description | Data Type |
|---|---|---|---|---|
| PDservice | E | 0 ... N | Container for Service fragment data of ATSC 3.0 or OMA BCAST service guide. Contains the following element: Service | container element |
| PDcontent | E | 0 ... N | Container for Content fragment data of ATSC 3.0 or OMA BCAST service guide. Contains the following element: Content | container element |
| PDschedule | E | 0 ... N | Container for Schedule fragment data of ATSC 3.0 or OMA BCAST service guide. Contains the following element: Schedule | container element |

A companion device may be configured to use one or more of the elements described in Table 11 for use with a second screen application. For example, a second screen application may be configured to use one or more of PDservice element, a PDcontent element, and a PDschedule element to provide an enhanced/alternative presentation of content. For example, a second screen application may use a PDcontent element to provide an alternative rendering of content. Primary device 200 may create a service guide information request response message using elements included in Table 10A and Table 10B and Table 11 according to a schema. FIG. 54 is a computer program listing illustrating an example schema of an example service guide information request response message including elements in Table 10B and Table 11 according to a JSON schema. FIG. 55 is a computer program listing illustrating an example schema of an example service guide information request response message including elements in Table 10B and Table 11 according to a XML schema.

Further, in one example, a REST mechanism may be used by primary device 200 to provide a service guide information request response message to a companion device. In one example, primary device 200 may provide a service guide information subscription request response message in response to a HTTP GET or HTTP POST REST request from a companion device. For example, primary device 200 may provide a response to a service guide information request message described above.

It should be noted that in addition to the communication mechanisms described above, other mechanisms may be utilized by primary device 200 and/or companion device to communication one or more of the messages described herein. In one example, a WebSocket mechanism may be used for communicating content communication information messages, including service guide information messages, between primary device 200 and companion device 300. Additionally, Hybrid broadcast broadband TV (HbbTV) defined mechanisms (e.g. HbbTV 2.0 companion screen mechanisms) may be used for communicating content communication information messages between primary device 200 and companion device 300. In this case, in one example, the communication between primary device 200 and companion device 300 may be carried out as "application to application communication" as defined in HbbTV (e.g., applications 208 to applications 308).

In one example, a Universal Plug and Play (UPnP) Service may be defined for some or all of the content information message exchanges between primary device 200 and companion device 300. This may allow any UPnP control point to discover the UPnP content information communication message service. In this case, the content information may be transmitted from primary device 200 to companion device 300 via a UPnP control mechanism and/or via a UPnP eventing mechanism.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc, laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of transmitting content information for a particular item of content, the method comprising:
   receiving a content information subscription request message;
   transmitting a content information subscription request response message; and
   transmitting one or more content information notification messages during a subscription, wherein a content information notification message includes information indicating a role of an individual component associated with the particular item of content; wherein
   the content information notification message further includes information indicating a type of the individual component associated with the particular item of content, and
   the information indicating the type of the individual component associated with the particular item of content includes an element having an unsigned byte data type, wherein a value of zero for the element indicates an audio component type, a value of one for the element indicates a video component type, and a value of two for the element indicates a closed caption component type.

2. The method of claim 1, wherein the information indicating the role of the individual component associated with the particular item of content includes an element having a string data type.

3. A method of transmitting content information for a particular item of content, the method comprising:
receiving a content information subscription request message;
transmitting a content information subscription request response message; and
transmitting one or more content information notification messages during a subscription, wherein a content information notification message includes information indicating a role of an individual component associated with the particular item of content, wherein
the content information notification message further includes information indicating an encoding of a file content item associated with the particular item of content.

4. The method of claim 3, wherein the information indicating the encoding of the file content item associated with the particular item of content includes an element having a string data type.

5. The method of claim 3, wherein the information indicating the role of the individual component associated with the particular item of content includes an element having a string data type.

6. A device for transmitting content information for a particular item of content, the device comprising one or more processors configured to:
receive a content information subscription request message;
transmit a content information subscription request response message; and
transmit one or more content information notification messages during a subscription, wherein a content information notification message includes information indicating a role of an individual component associated with the particular item of content, wherein
the content information notification message further includes information indicating a type of the individual component associated with the particular item of content, and
the information indicating e of the individual component associated with the particular item of content includes an element having an unsigned byte data type, wherein a value of zero for the element indicates an audio component type, a value of one for the element indicates a video component type, and a value of two for the element indicates a closed caption component type.

7. The device of claim 6, wherein the information indicating the role of the individual component associated with the particular item of content includes an element having a string data type.

8. The device of claim 6, wherein the particular item of content includes a television program and wherein the one or more processors are further configured to cause the television program to be rendered on a display system.

9. A device, for transmitting content information for a particular item of content, the device comprising one or more processors configured to:
receive a content information subscription request message;
transmit a content information subscription request response message; and
transmit one or more content information notification messages during a subscription, wherein a content information notification message includes information indicating a role of an individual component associated with the particular item of content, wherein
the content information notification message further includes information indicating an encoding of a file content item associated with the particular item of content.

10. The device of claim 9, wherein the information indicating the encoding of the file content item associated with the particular item of content includes an element having a string data type.

11. The device of claim 9, wherein the information indicating the role of the individual component associated with the particular item of content includes an element having a string data type.

12. A device for receiving content information, the device comprising one or more processors configured to:
transmit a content information subscription request message;
receive a content information subscription request response message; and
receive one or more content information notification messages during a subscription, wherein a content information notification message includes information indicating a role of an individual component associated with the particular item of content, wherein
the content information notification message further includes information indicating a type of the individual component associated with the particular item of content, and
the information indicating a type of the individual component associated with the particular item of content includes an element having an unsigned byte data type, wherein a value of zero for the element indicates an audio component type, a value of one for the element indicates a video component type, and a value of two for the element indicates a closed caption component type.

13. The device of claim 12, wherein the information indicating the role of the individual component associated with the particular item of content includes an element having a string data type.

14. The device of claim 12, wherein the device is selected from the group consisting of: a desktop or laptop computer, a mobile device, a smartphone, a cellular telephone, a personal data assistant, a tablet device, or a personal gaming device, and wherein the one or more processors are further configured to run a second screen application.

15. The device of claim 12, wherein the information indicating the role of the individual component associated with the particular item of content includes an element having a string data type.

16. The device, for receiving content information, the device comprising one or more processors configured to:
transmit a content information subscription request message;
receive a content information subscription request response message; and
receive one or more content information notification messages during a subscription, wherein a content information notification message includes information indicating a role of an individual component associated with the particular item of content, wherein the content information notification message further includes information indicating an encoding of a file content item associated with the particular item of content.

17. The device of claim 16, wherein the information indicating the encoding of the file content item associated with the particular item of content includes an element having a string data type.

* * * * *